(12) United States Patent
Kim

(10) Patent No.: US 10,540,023 B2
(45) Date of Patent: Jan. 21, 2020

(54) USER INTERFACE DEVICES FOR VIRTUAL REALITY SYSTEM

(71) Applicant: Yong Bum Kim, Gyeonggi-do (KR)

(72) Inventor: Yong Bum Kim, Gyeonggi-do (KR)

( * ) Notice: Subject to any disclaimer, the term of this patent is extended or adjusted under 35 U.S.C. 154(b) by 137 days.

(21) Appl. No.: 15/715,539

(22) Filed: Sep. 26, 2017

(65) Prior Publication Data

US 2019/0094993 A1    Mar. 28, 2019

(51) Int. Cl.
*G06F 3/0354* (2013.01)
*G06F 3/01* (2006.01)
*H04N 5/225* (2006.01)

(52) U.S. Cl.
CPC .......... *G06F 3/03542* (2013.01); *G06F 3/011* (2013.01); *G06F 3/03547* (2013.01); *H04N 5/2252* (2013.01); *H04N 5/225* (2013.01); *H04N 5/2256* (2013.01)

(58) Field of Classification Search
CPC .... A63F 7/36; G06F 3/03545; G06F 3/03547; G02B 6/001
See application file for complete search history.

(56) References Cited

U.S. PATENT DOCUMENTS

| | | |
|---|---|---|
| 4,692,568 A | 9/1987 | Morita |
| 4,723,836 A | 2/1988 | Kono et al. |
| 4,806,708 A | 2/1989 | Yahagi |
| 5,117,071 A | 5/1992 | Greanias et al. |
| 5,942,733 A | 8/1999 | Allen et al. |
| 6,002,389 A | 12/1999 | Kasser |
| 6,290,565 B1 * | 9/2001 | Galyean, III ............ A63H 3/16 273/148 B |
| 2010/0001963 A1 * | 1/2010 | Doray ................. G06F 3/03545 345/173 |
| 2012/0127110 A1 | 5/2012 | Amm et al. |
| 2014/0111912 A1 * | 4/2014 | Gobeil ................. G06F 1/1626 361/679.01 |
| 2014/0139455 A1 * | 5/2014 | Argiro .................... A63F 13/02 345/173 |
| 2015/0070330 A1 | 3/2015 | Stern |

(Continued)

FOREIGN PATENT DOCUMENTS

| | | |
|---|---|---|
| EP | 432139 A2 | 6/1991 |
| EP | 736838 A1 | 10/1996 |

(Continued)

*Primary Examiner* — Kevin M Nguyen
(74) *Attorney, Agent, or Firm* — Kilpatrick Townsend & Stockton LLP

(57) ABSTRACT

A virtual reality user interface device having a pad and a stylus pen is provided. The pad includes a transparent touch part, a pad tracking part, a touch part frame, and a plurality of light sources disposed on an outside surface of the pad tracking part. The touch part frame is coupled with an outer border area of the transparent touch part and coupled to a portion of the pad tracking part. The pad tracking part includes extension portions extending in a longitudinal direction of the transparent touch part at the periphery of both sides of the transparent touch part from the pad tracking part. The stylus pen includes a stylus grip, a stylus tip detachably mounted to the stylus grip, a stylus tracking part coupled to the stylus grip, and a plurality of light sources disposed on an outside surface of the stylus tracking part.

26 Claims, 50 Drawing Sheets

(56) References Cited

U.S. PATENT DOCUMENTS

| | | | |
|---|---|---|---|
| 2015/0169173 A1* | 6/2015 | Chavez | G06F 3/012 |
| | | | 345/419 |
| 2016/0131761 A1 | 5/2016 | Yates et al. | |
| 2016/0257249 A1 | 9/2016 | Urase et al. | |
| 2016/0357261 A1 | 12/2016 | Bristol et al. | |
| 2016/0361637 A1 | 12/2016 | Higgins et al. | |
| 2016/0361638 A1 | 12/2016 | Higgins et al. | |
| 2016/0364910 A1 | 12/2016 | Higgins et al. | |
| 2017/0128828 A1 | 5/2017 | Long | |
| 2017/0139481 A1 | 5/2017 | Long | |
| 2017/0173453 A1 | 6/2017 | Huang | |
| 2017/0228051 A1* | 8/2017 | Wu | G06F 3/03542 |

FOREIGN PATENT DOCUMENTS

| | | |
|---|---|---|
| EP | 2717132 A2 | 4/2014 |
| GB | 2320096 B | 6/1998 |
| WO | WO 97/40488 A1 | 10/1997 |
| WO | WO2014/188417 A2 | 11/2014 |
| WO | WO 2016/138509 A1 | 9/2016 |
| WO | WO 2017/039909 A1 | 3/2017 |

* cited by examiner

USER INTERFACE DEVICES FOR VIRTUAL REALITY SYSTEM

TECHNICAL FIELD

This technology relates herein to virtual reality (VR) user interface devices, and more specifically to virtual reality user interface devices comprising a tablet and a stylus pen for input/output in a virtual reality environment.

BACKGROUND

Technologies for input/output in a virtual realty environment are inadequate or still very limited. Since a VR user interacts with the virtual objects created in the space where nothing exists, it is difficult for the VR user to be immersed deeply and to perform sophisticated input/output behavior. Although there are technologies using haptic sensors, ultrasonic waves, or magnetic fields that enable the VR user to feel the touch when he interacts with the virtual world, the technologies do not reach the level that makes the VR user feel a sense of handwriting while writing. Therefore, it is desirable to engage a real input tool such as a stylus pen in the virtual world and to use it for writing or drawing in a virtual reality environment. In particular, when handwriting is performed, it is necessary for the VR user to use a rigid substrate structure such as a pad to support the stylus pen and the user's hand holding the stylus pen during handwriting.

There are typically optical tracking methods and magnetic tracking methods available for detecting and tracking real objects in virtual reality environments. Optical tracking methods are often suitable for detecting the movement of a sophisticated object such as a stylus pen tip. In particular, it is desirable to apply a marker-based tracking method, a kind of optical tracking method, because it is the most robust and the most accurate among the optical tracking methods.

However, even with the marker-based tracking method, it is very difficult to track both the stylus pen and the pad without the use of additional cameras beyond those used for tracking the body of the VR user. This is especially true for larger pads. As the size of the pad gets larger, the pad may occlude the view of the cameras for tracking the body of the VR user, making it necessary to add a large number of cameras to the surrounding space of the VR user for avoiding the occlusion, thereby increasing the computational cost of the VR system.

Therefore, a new approach is needed to overcome the many technical challenges described above at low cost.

SUMMARY

Accordingly, the present disclosure satisfies these needs by providing VR user interface devices that can be tracked accurately without additional cameras for avoiding the occlusion.

According to an aspect of some embodiments of the present invention, a virtual reality user interface device comprises a pad and a stylus pen. The pad comprises a transparent touch part, a pad tracking part, a touch part frame, and a plurality of light sources disposed on an outside surface of the pad tracking part. The touch part frame is coupled with an outer border area of the transparent touch part and coupled to a portion of the pad tracking part. The pad tracking part comprises extension portions extending in a longitudinal direction of the transparent touch part at the periphery of both sides of the transparent touch part from the pad tracking part. The stylus pen comprises a stylus grip, a stylus tip detachably mounted to the stylus grip, a stylus tracking part coupled to the stylus grip, and a plurality of light sources disposed on an outside surface of the stylus tracking part.

In some embodiments, at least a portion of the plurality of light sources disposed on the outside surface of the stylus tracking part are detected and tracked through the transparent touch part by one or more external cameras when the field of view of the one or more external cameras looking at the portion of the plurality of light sources disposed on the outside surface of the stylus tracking part is occluded by the pad.

In some embodiments, the pad further comprises one or more inertial measurement units.

In some embodiments, the stylus pen further comprises one or more inertial measurement units.

In some embodiments, the pad further comprises a touch part frame. The touch part frame is coupled with an outer border area of the transparent touch part and is coupled to at least a portion of the pad tracking part.

In some embodiments, the pad further comprises a pad grip. The pad grip is detachably mounted to at least one of the pad tracking part, the transparent touch part, and the touch part frame.

In some embodiments, the transparent touch part further comprises a plurality of light sources disposed on an outside surface of the transparent touch part.

In some embodiments, the touch part frame further comprises a plurality of light sources disposed on an outside surface of the touch part frame.

In some embodiments, the extension portions are inclined at an angle with respect to the transparent touch part such that upper sections of the extension portions are closer to a VR user side than the transparent touch part when viewed from a side of the pad.

In some embodiments, the extension portions are curved concave toward the VR use side such that the upper sections of the extension portions are closer to the VR user side than the transparent touch part when viewed from the side of the pad.

In some embodiments, the extension portions are connected to at least one of the touch part frame, the transparent touch part and the pad tracking part by one or more support frames.

In some embodiments, the extension portions are inclined at an angle with respect to the transparent touch part such that outer sections of the extension portions are closer to the VR user side than inner sections of the extension portions when viewed from an upper side of the pad.

In some embodiments, the surfaces of the side opposite the VR user side of the extension portions are curved convexly when viewed from the upper side of the pad.

In some embodiments, the stylus tracking part is coupled to a first section of the stylus grip. The first section of the stylus grip is a stylus grip area between the stylus grip boundary with a distance of 1 mm from the stylus tip and the stylus grip boundary with a distance of 70 mm from the stylus tip.

In some embodiments, the stylus tracking part is coupled to a second section of the stylus grip. The second section of the stylus grip is the stylus grip area between the stylus grip boundary with a distance of 25 mm from the stylus tip and the end of the stylus grip opposite the stylus tip.

In some embodiments, the stylus tracking part is coupled to the first section and the second section of the stylus grip, and the stylus tracking part extends from the first section of the stylus grip to the second section of the stylus grip above the index finger and the thumb of the VR user holding the stylus grip.

In some embodiments, the stylus pen further comprises one or more support fixtures coupled to the stylus grip area between the stylus grip boundary with a distance of 2 mm from the stylus tip and the end of the stylus grip opposite the stylus tip. The support fixtures are coupled to the stylus tracking part at the ends opposite the ends of the support fixtures that are coupled to the stylus grip.

In some embodiments, the stylus pen comprises a plurality of separated stylus tracking parts, and further comprises one or more support fixtures coupled to the stylus grip area between the stylus grip boundary with a distance of 2 mm from the stylus tip and the end of the stylus grip opposite the stylus tip. The support fixtures are coupled to the plurality of separated stylus tracking parts at the ends opposite the ends of the support fixtures that are coupled to the stylus grip.

In some embodiments, the stylus pen further comprises a support fixture containing finger grip sections on both sides of the support fixture. The finger grip sections are concave. The support fixture is coupled to the stylus grip area between the stylus grip boundary with a distance of 2 mm from the stylus tip and the end of the stylus grip opposite the stylus tip. The support fixture is coupled to the stylus tracking part at the end opposite the end of the support fixture that is coupled to the stylus grip.

In some embodiments, the stylus tracking part comprises a plurality of void areas in the inner area of the stylus tracking part.

In some embodiments, the stylus tracking part comprises one or more skeletal structures formed by connecting a plurality of frames together.

In some embodiments, the stylus tip is integrated into the stylus grip.

In some embodiments, the stylus pen further comprises one or more input devices on at least one of the stylus grip and the stylus tracking part.

In some embodiments, the stylus pen further comprises one or more balance weights mounted on at least one of the stylus grip and the stylus tracking part.

In some embodiments, the virtual reality user interface device further comprises a stylus control unit wired electrically to the stylus pen. The stylus control unit comprises a power source to supply power to the stylus pen and a controller to control the stylus pen.

In some embodiments, the plurality of light sources disposed on the outside surface of the pad tracking part comprises a plurality of light emitting diodes.

In some embodiments, the plurality of light sources disposed on the outside surface of the stylus tracking part comprises a plurality of light emitting diodes.

In some embodiments, the plurality of light sources disposed on the outside surface of the pad tracking part comprises a plurality of passive reflective markers.

In some embodiments, the plurality of light sources disposed on the outside surface of the stylus tracking part comprises a plurality of passive reflective markers.

In some embodiments, a virtual reality user interface device comprises a pad and a stylus pen. The pad comprises a transparent touch part, a pad tracking part, a touch part frame, a plurality of support frames, and a plurality of light sources disposed on an outside surface of the pad tracking part. The touch part frame is coupled with an outer border area of the transparent touch part and coupled to a portion of the pad tracking part. The pad tracking part comprises extension portions extending in a longitudinal direction of the transparent touch part at the periphery of both sides of the transparent touch part from the pad tracking part. The extension portions are inclined at an angle with respect to the transparent touch part such that upper sections of the extension portions are closer to a VR user side than the transparent touch part when viewed from a side of the pad. The extension portions are inclined at an angle with respect to the transparent touch part such that the outer sections of the extension portions are closer to the VR user side than the inner sections of the extension portions when viewed from an upper side of the pad. The surfaces of the side opposite the VR user side of the extension portions are curved convexly when viewed from the upper side of the pad. The plurality of support frames connects the extension portions and the touch part frame. The stylus pen comprises a stylus grip, a stylus tip detachably mounted to the stylus grip, a stylus tracking part coupled to the stylus grip, a plurality of light sources disposed on an outside surface of the stylus tracking part, and an input device mounted on the stylus grip.

In some embodiments, a virtual reality user interface device comprises a pad and a stylus pen. The pad comprises a transparent touch part, a touch part frame coupled with an outer border area of the transparent touch part, and a plurality of light sources disposed on an outside surface of the touch part frame. The stylus pen comprises a stylus grip, a stylus tip detachably mounted to the stylus grip, a stylus tracking part coupled to the stylus grip, and a plurality of light sources disposed on an outside surface of the stylus tracking part.

DETAILED DESCRIPTION

Virtual reality user interface devices including a stylus pen and a pad may be required for actions such as writing and drawing during VR education or VR entertainment applications. For example, in order to draw or write on the pad in a VR environment, the position of the stylus pen and the position of the pad relative to the position of the stylus pen, and whether the stylus pen is contacting the surface of the pad must be derived.

The stylus pen and the pad comprise a plurality of illuminants or reflectors which are used as optical markers in order for external cameras to detect the positions and the attitudes (yaw/pitch/roll) of the stylus pen and the pad in a VR environment. In some cases, the pad may occlude the optical markers coupled to the stylus pen or a portion of VR user's body from the field of view of the external cameras installed at the periphery of the VR user.

Therefore, in order to overcome such occlusions without additional cameras, the pad includes a transparent touch area through which the external cameras can detect and track the positions and the attitudes of the stylus pen or the VR user's body.

The stylus pen may further comprise a pressure sensor embedded in the body of the stylus pen to sense whether the stylus pen is touching the surface of the pad during the VR writing. In some cases, the pad may further comprise a transparent touch sensor on the transparent touch area for sensing the exemplary touch action and for determining the location of the touch in the transparent touch area.

Figure 1A:
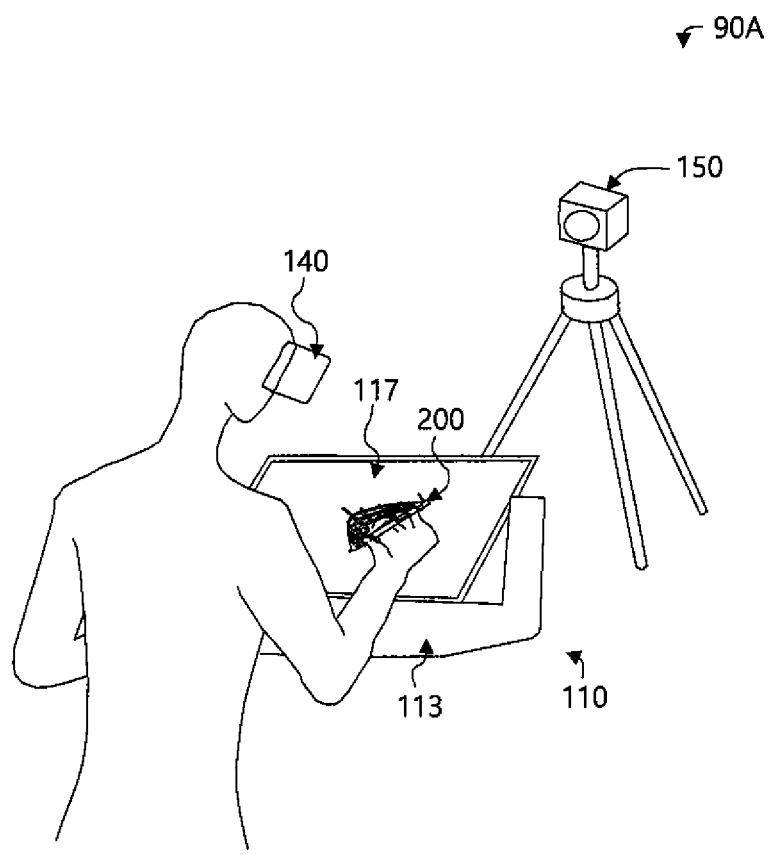
FIG. 1A-1D illustrate some exemplary implementations of VR user interface devices in virtual reality systems.
Figure 1B:
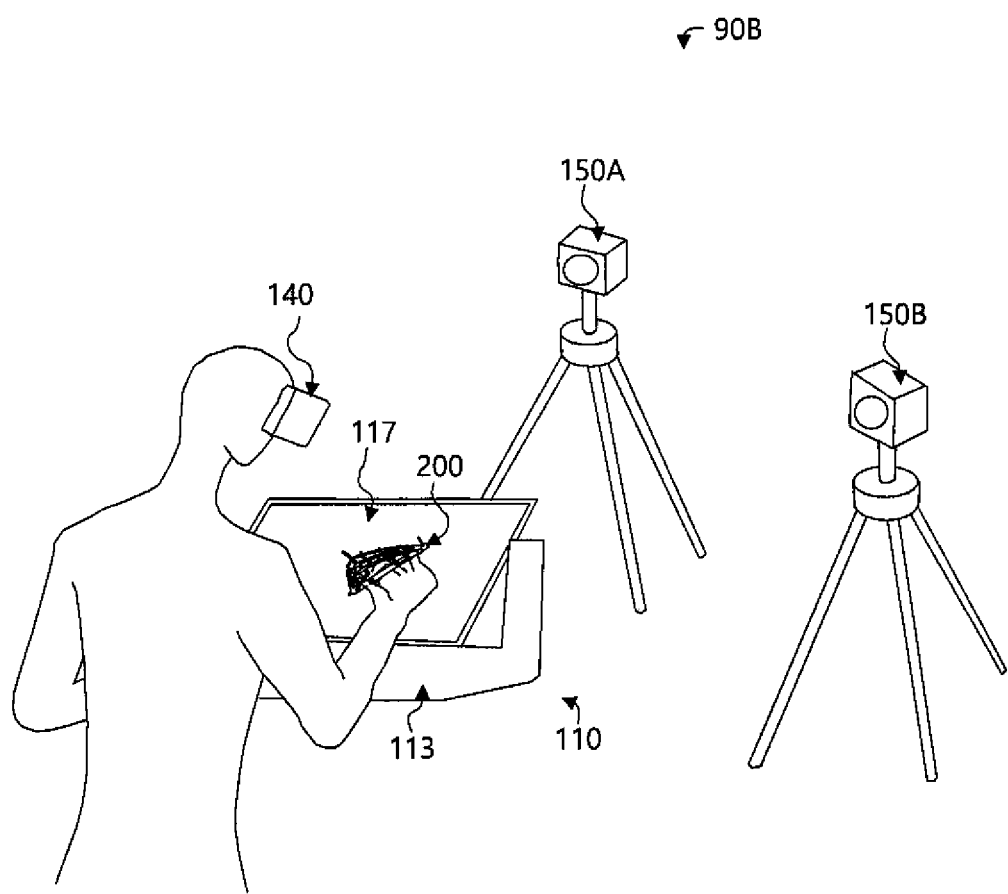
Figure 1C:
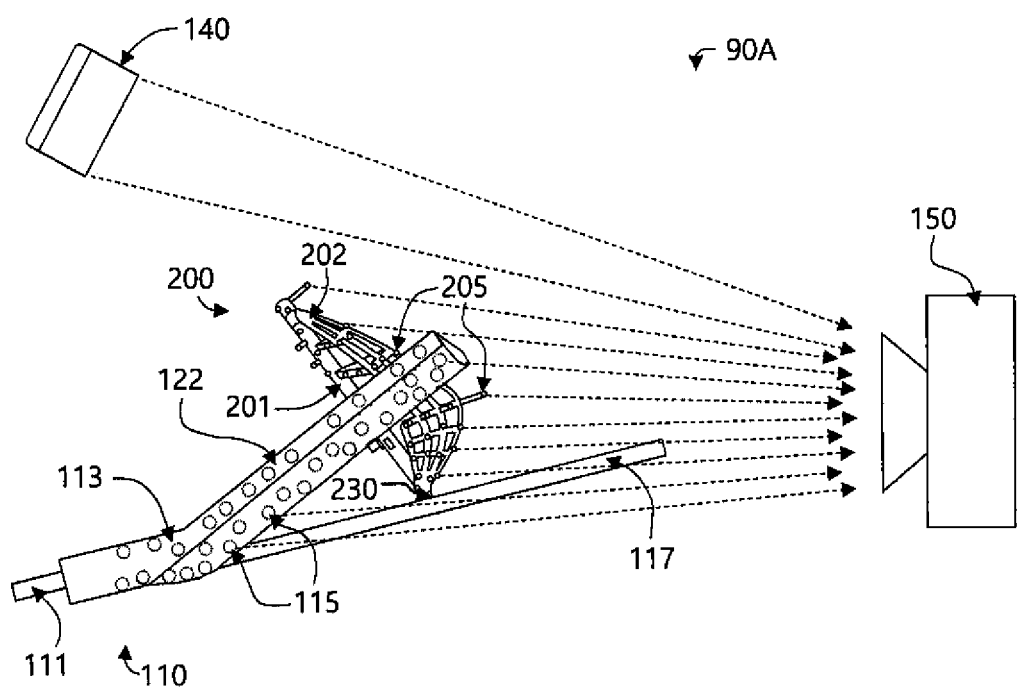
Figure 1D:
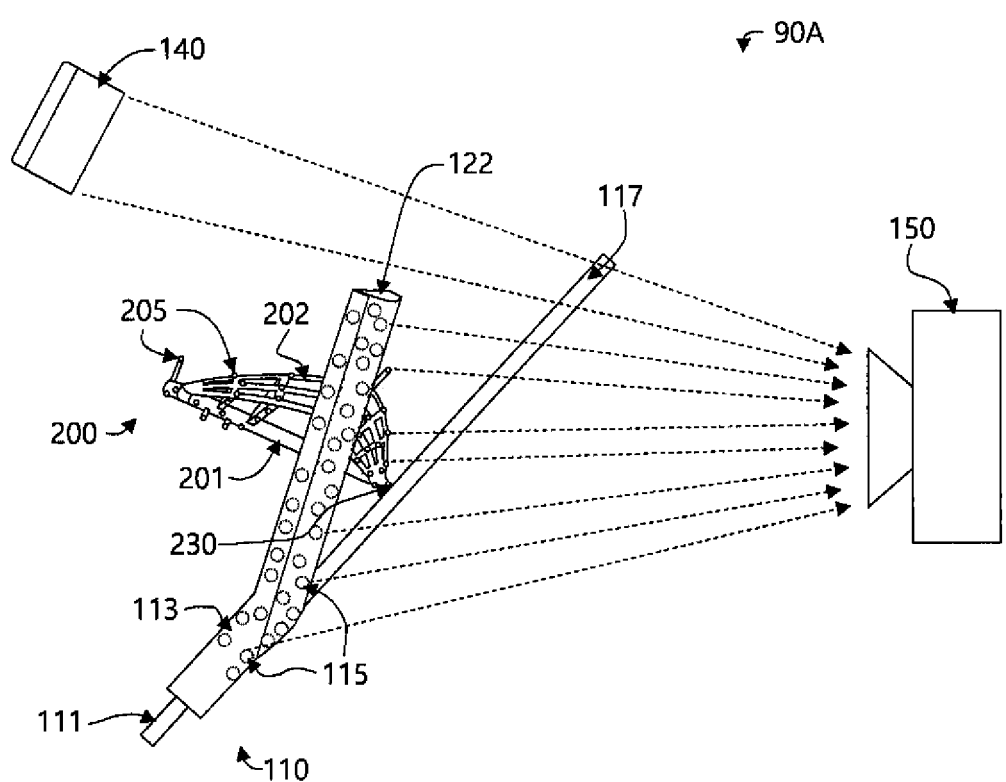

FIG. 1A-1D illustrate some exemplary implementations of VR user interface devices in virtual reality systems. The virtual reality systems 90A and 90B each may comprise a stylus pen 200, a pad 110, a VR head mounted display (HMD) 140, and one or more external cameras 150 or 150A and 150B as illustrated in FIG. 1A and 1B. The pad 110 may comprise a pad tracking part 113, a plurality of light sources 115 disposed on an outside surface of the pad tracking part 113 and set to emit light that can be detected by the external cameras 150 or 150A and 150B, and a transparent touch part 117 coupled to the pad tracking part 113. The transparent touch part 117 may be transparent and/or have a transparent portion as illustrated in FIG.1C and 1D. The stylus pen 200 may comprise a stylus grip 201, a stylus tip 230 mounted to the stylus grip 201, a stylus tracking part 202 coupled to the stylus grip 201, and a plurality of light sources 205 disposed on an outside surface of the stylus tracking part 202 and set to emit light that can be detected by the external cameras 150 or 150A and 150B. The external cameras 150 or 150A and 150B may detect and track the VR HMD 140 and lights emitted by the plurality of light sources 115, 205 disposed on the outside surfaces of the pad tracking part 113 and the stylus tracking part 202, respectively. For example, in some cases, at least a portion of the VR HMD 140, at least a portion of the plurality of light sources 115 disposed on the outside surface of the pad 110, and at least a portion of the plurality of light sources 205 disposed on the outside surface of the stylus pen 200 can be detected clearly without occlusions by the external cameras 150 or 150A and 150B as illustrated in FIG. 1C. But, if the field of view of the external cameras 150 or 150A and 150B looking at the portion of the plurality of light sources 205 disposed on the outside surface of the stylus pen 200 and/or the portion of the VR HMD 140 is occluded by the pad 110, the portion of the plurality of light sources 205 disposed on the outside surface of the stylus pen 200 and/or the portion of the VR HMD 140 may be tracked through the transparent touch part 117 of the pad 110 by the external cameras 150 or 150A and 150B as illustrated in FIG. 1D. Since most of the movement of the stylus pen 205 is made on the pad 110 and the view of the external cameras 150 or 150A and 150B toward the stylus pen 200 can be often occluded by the pad 110, the pad 110 needs to comprise the transparent touch part 117 in order for the external cameras 150 or 150A and 150B to detect and track the plurality of light sources 205 disposed on the outside surface of the stylus pen 200 through the transparent touch part 117. The external cameras 150 or 150A and 150B capture the instant images of the VR HMD 140, at least a portion of the plurality of light sources 115 disposed on the outside surface of the pad 110, and at least a portion of the plurality of light sources 205 disposed on the outside surface of the stylus pen 200, and transfer these data to the VR HVD 140 and/or other VR computer systems. The VR HMD 140 or other VR computer systems derive the attitudes (yaw/pitch/roll) and the positions (x, y, z coordinates) of the VR HMD 140, the pad 110, and the stylus pen 200, based on the transferred data. The VR HMD 140, the pad 110, and the stylus pen 200 is rendered based on the derived data in the VR HMD 140, or transferred from the other VR computer systems to the VR HMD 140 and rendered in the VR HMD 140. In a virtual reality space rendered in the VR HMD 140, VR contents such as movies or a virtual web-browser or a virtual PC may be implemented on the rendered pad as a virtual tablet or a virtual screen.

To implement the above procedure, the external cameras 150 or 150A and 150B, the VR HMD 140 or other VR computer systems may have wireless or wired communication interfaces.

When the stylus pen 200 touches the surface of the transparent touch part 117, various functions and actions such as writing or drawing or selecting or image-capturing or menu floating enabled in application programs may be activated or deactivated in the VR HMD or other VR computer systems, based on the location of the touch of the stylus pen 200 in the transparent touch part 117 area, and rendered in the VR HMD 140. For example, if the rendered stylus pen touches a specific area or a specific menu of the VR contents displayed on the rendered pad, the exemplary various functions and the exemplary actions of the VR contents are activated or deactivated and then the results are implemented on the rendered pad or in a virtual reality space.

The location of the touch in the surface of the transparent touch part 117 area can be determined, based on data derived from the captured images.

In some embodiments, the stylus pen 200 may further comprise a pressure sensor in the stylus tip 230 or stylus grip 201 for clarifying the occurrences of the touch.

In some embodiments, the transparent touch part 117 may further comprise one or more transparent touch sensor layer coupled to the surface of the transparent touch part 117 for sensing a touch of the stylus pen 200 and determining the location of the touch in the transparent touch part 117 area.

In some embodiments, If the external cameras 150 or 150A and 150B have their own built-in VR computer systems, the deriving process can be performed by the built-in VR computer systems.

In some embodiments, the pad 110 and the stylus pen 200 may further comprise wireless or wired communication interfaces for communicating with each other or the VR HMD 140 or the external cameras 150 or 150A and 150B or other VR computer systems.

In some embodiments, one or more independent tracking units may be detachably mounted to one or more portions of the pad 110 or the stylus pen 200 for detecting and tracking the pad 110 or the stylus pen 200.

In some embodiments, a plurality of light sources may be detachably disposed on or embedded under an outside surface of the independent tracking units.

In some embodiments, one or more cameras may be mounted to the independent tracking units.

In some embodiments, the plurality of light sources 115, 205 disposed on the outside surfaces of the pad 110 or the stylus pen 200 may comprise a plurality of light emitting diodes.

In some embodiments, the external cameras 150 or 150A and 150B may detect and track lights emitted by the plurality of light emitting diodes.

In some embodiments, the plurality of light sources 115, 205 disposed on the outside surfaces of the pad 110 or the stylus pen 200 may comprise a plurality of infrared light emitting diodes.

In some embodiments, the external cameras 150 or 150A and 150B may detect and track infrared lights emitted by the plurality of infrared light emitting diodes.

In some embodiments, the plurality of light sources 115, 205 disposed on the outside surfaces of the pad 110 and the stylus pen 200 may be modulated at different timings to have unique IDs.

Figure 1E:
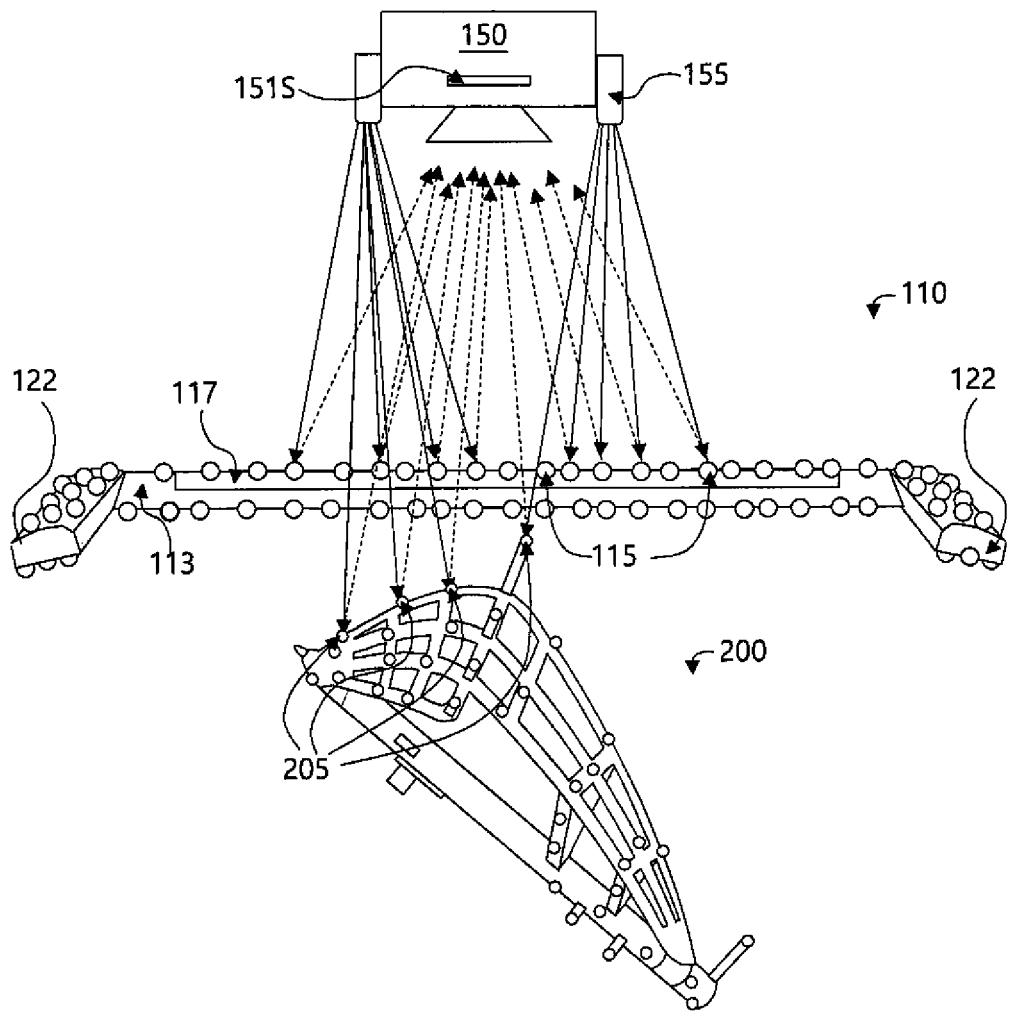
FIG. 1E illustrates another exemplary implementation of VR user interface devices in virtual reality systems.

FIG. 1E illustrates another exemplary implementation of VR user interface devices in virtual reality systems 90A and 90B. The exemplary plurality of light sources 115, 205 disposed on the outside surfaces of the exemplary pad 110 or the exemplary stylus pen 200 may comprise a plurality of passive reflective markers. The exemplary external cameras 150 or 150A and 150B may further comprise one or more light emitters 155 for supplying light to the passive reflective markers and one or more image sensors 151S for detecting and tracking the lights reflected by the passive reflective markers and coming back.

If the field of view of the external cameras 150 or 150A and 150B looking at a portion of the plurality of passive reflective markers disposed on the outside surface of the stylus pen 200 is occluded by the pad, the lights reflected from the portion of the plurality of passive reflective markers disposed on the outside surface of the stylus pen 200 may be tracked through the transparent touch part 117 of the pad 110 by the external cameras 150 or 150A and 150B.

In some embodiments, the plurality of light sources 115, 205 disposed on the outside surfaces of the pad 110 or the stylus pen 200 may comprise a plurality of photo detective sensors. One or more external structured light emitters may be placed in the surrounding space of a VR user to emit structured lights, and the plurality of photo detective sensors may detect and track the structured lights emitted by the structured light emitters.

If the field of view of a portion of the plurality of photo detective sensors disposed on the outside surface of the stylus pen 200 looking at the structured light emitters is occluded by the pad, the portion of the plurality of photo detective sensors disposed on the outside surface of the stylus pen 200 may receive and track the structured lights emitted by the structured light emitters, through the transparent touch part 117 of the pad 110. The attitudes (yaw/pitch/roll) and the positions (x, y, z coordinates) of the pad 110 and the stylus pen 200 is derived, based on the tracked data.

Figure 2A:
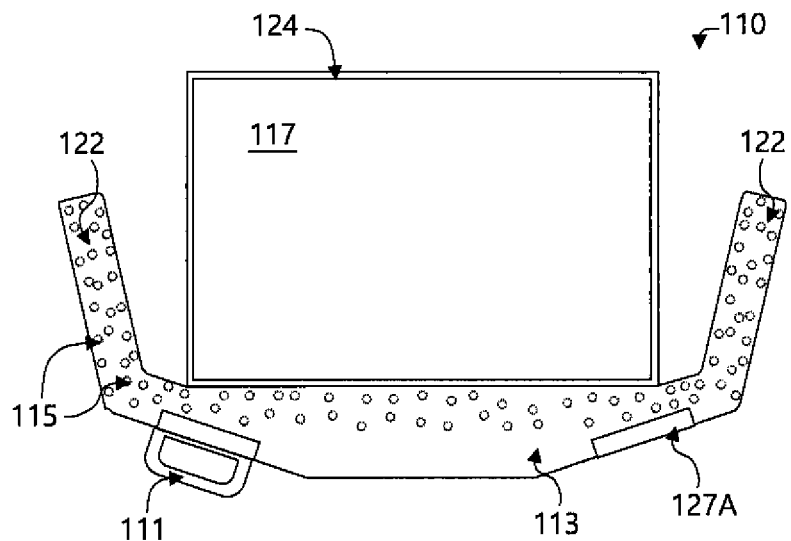
FIG. 2A-2O illustrate some implementations of pads of the exemplary VR user interface devices.

FIG. 2A-2O illustrate some implementations of pads 110 of the exemplary VR user interface devices. The pads 110 each may comprise a pad tracking part 113, a plurality of light sources 115 detachably disposed on or embedded under an outside surface of the pad tracking part 113, and a transparent touch part 117 detachably coupled to or integrated into the pad tracking part 113. The plurality of light sources 115 may comprise the exemplary plurality of light emitting diodes or the exemplary plurality of infrared light emitting diodes or the exemplary plurality of passive reflective markers or the exemplary plurality of photo detective sensors. The plurality of light sources 115 may be set to emit light or reflect light or detect light, and the transparent touch part 117 may be transparent such that light may pass through.

In some embodiments, the pad 110 may further comprises a touch part frame 124 to prevent bending of the transparent touch part 117. The touch part frame 124 is detachably coupled with or integrated into the outer border area of the transparent touch part 117 and detachably coupled to or integrated into at least a portion of the pad tracking part 113.

In some embodiments, the pad 110 may further comprise a pad grip 111, and the pad grip 111 may be detachably mounted to or integrated into at least one of the pad tracking part 113, the transparent touch part 117, and the touch part frame 124.

Figure 2B:
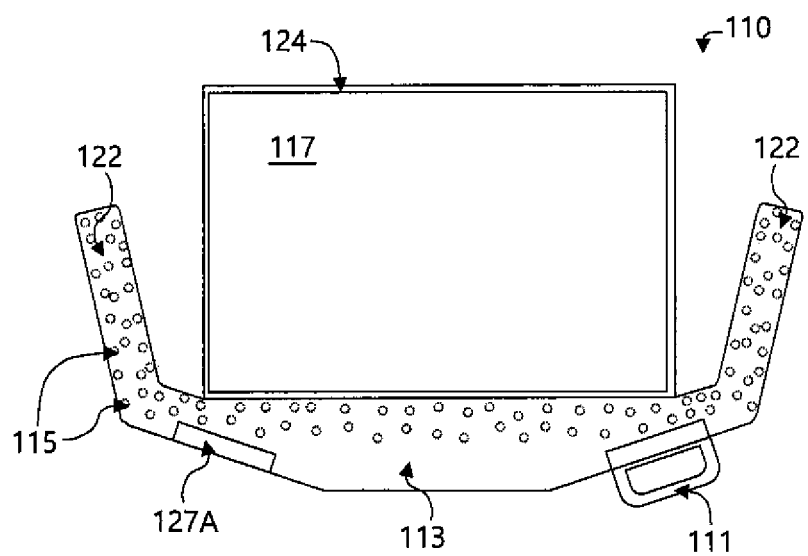
FIG. 2P-2S illustrate some implementations of pads of the exemplary VR user interface devices being tracked by the exemplary external cameras.

In some embodiments, the attachment site of the pad grip 111 may or may not be determined, and if determined, the pad grip 111 must be mounted only to the determined attachment site 127A as illustrated in FIG. 2A-2B.

In some embodiments, the exemplary plurality of light sources 115 may be detachably disposed on or embedded under an outside surface of at least one portions of the pad 110 (other than the pad tracking part 113) including the transparent touch part 117, the pad grip 111, and the touch part frame 124.

In some embodiments, the pad tracking part 113 may comprise extension portions 122 extending in a longitudinal direction of the transparent touch part 117 at the periphery of both sides of the transparent touch part 117 from the pad tracking part 113, and the plurality of light sources 115 may be detachably disposed on or embedded under an outside surface of the extension portions 122 as illustrated in FIG. 2A-2B.

Figure 2C:
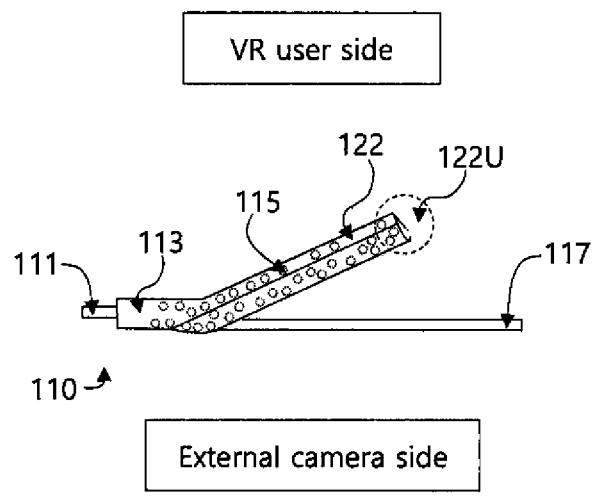

In some embodiments, the extension portions 122 are inclined at an angle with respect to the transparent touch part 117 such that upper sections 122U of the extension portions 122 are closer to a VR user side than the transparent touch part 117 when viewed from the side of the pad 110 as illustrated in FIG. 2C. When the pad 110 is tilted close to horizontal by a VR user, the inclined form of the extension portions 122 increases the projected area of the array of the plurality of light sources 115 disposed on the outside surface of the pad tracking part 113 onto the image sensors 151S of the exemplary external cameras 150 or 150A and 150B, and facilitate the array of the plurality of light sources 115 to be clearly detected by the exemplary external cameras 150 or 150A and 150B, and the attitude and the position of the pad 110 to be accurately derived.

Figure 2D:
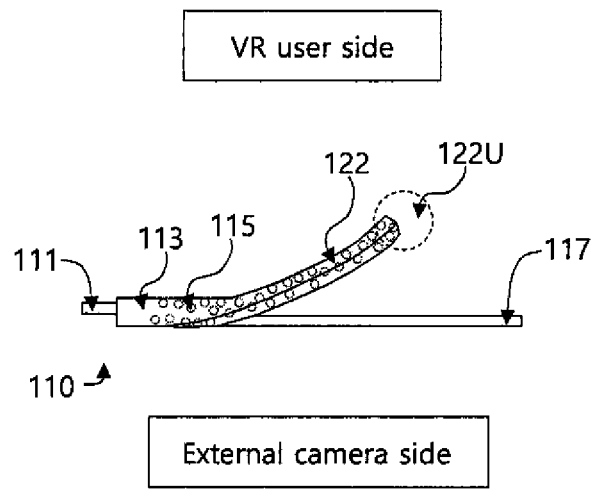

In some embodiments, the extension portions 122 are curved concave toward the VR use side such that the upper sections 122U of the extension portions 122 are closer to the VR user side than the transparent touch part 117 when viewed from the side of the pad 110 as illustrated in FIG. 2D. When the pad 110 is tilted close to horizontal by a VR user, the curved form of the extension portions 122 increases the projected area of the array of the plurality of light sources 115 disposed on the outside surface of the pad tracking part 113 onto the image sensors 151S of the exemplary external cameras 150 or 150A and 150B, and facilitate the array of the plurality of light sources 115 to be clearly detected by the exemplary external cameras 150 or 150A and 150B, and the attitude and the position of the pad 110 to be accurately derived.

Figure 2E:
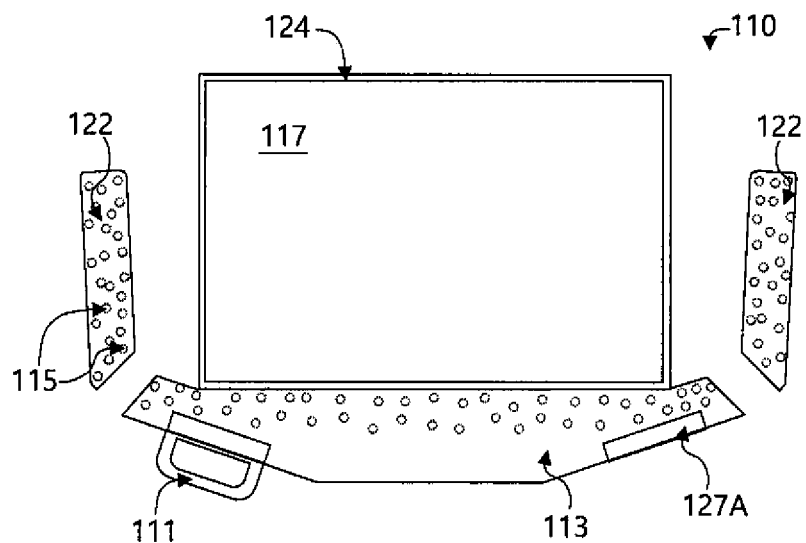

In some embodiments, the exemplary extension portions 122 extending from the pad tracking part 113 can be detached from the pad tracking part 113 as illustrated in FIG. 2E.

Figure 2F:
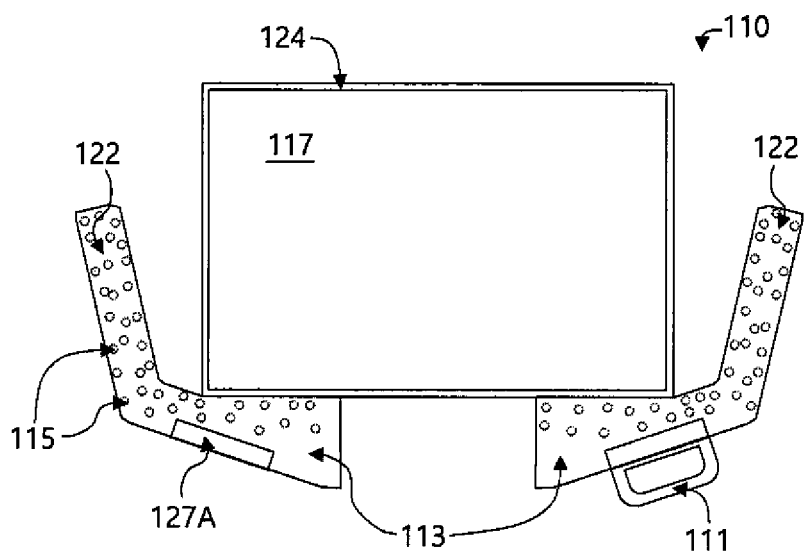
Figure 2G:
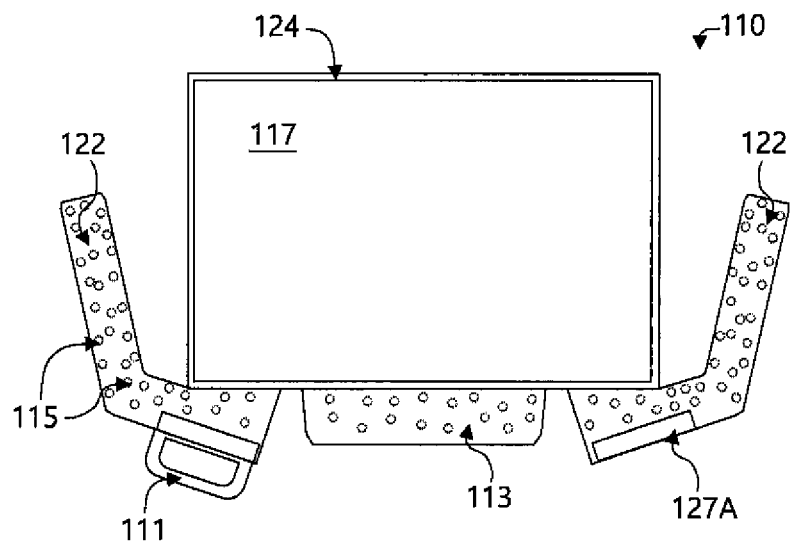

In some embodiments, the pad tracking part 113 may be divided into two or more parts, and each of the parts can be attached to a portion of the transparent touch part 117 or a portion of the touch part frame 124 as illustrated in FIG. 2F and FIG. 2G.

Figure 2H:
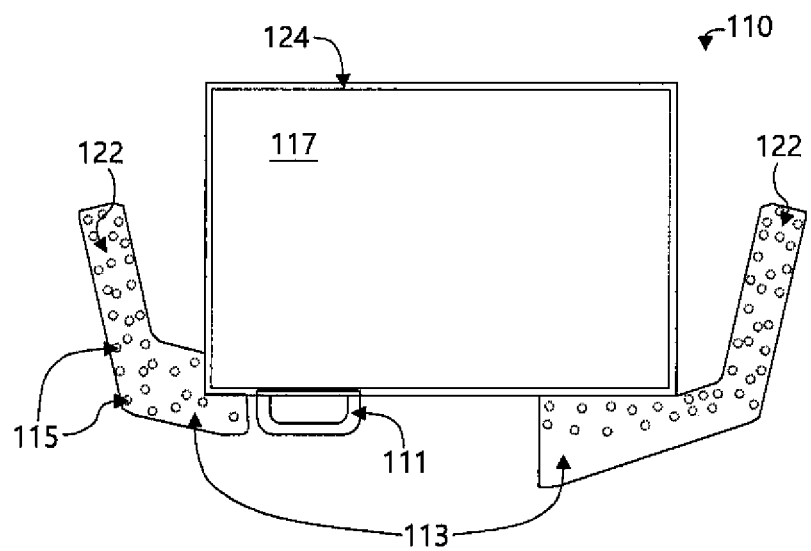

In some embodiments, the pad tracking part 113 may be divided into two or more parts, and each of the parts may be coupled to a portion of the transparent touch part 117 or a portion of the touch part frame 124, and the pad grip 111 may be coupled to a portion of the transparent touch part 117 or a portion of the touch part frame 124 as illustrated in FIG. 2H.

Figure 2I:
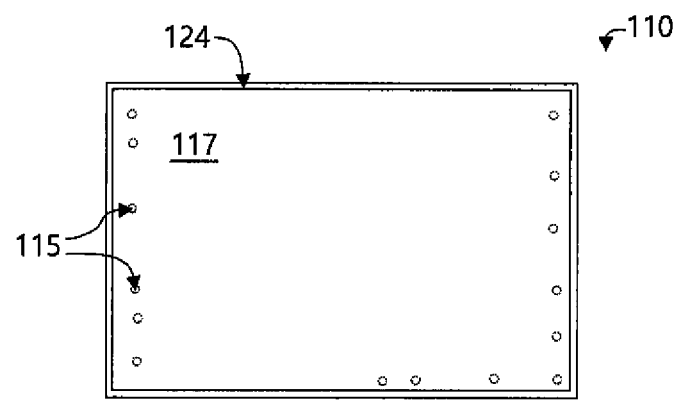

In some embodiments, the plurality of light sources 115 may be detachably disposed on or embedded under an outside surface of the transparent touch part 117 or the touch part frame 124 without the pad tracking part 113 and the pad grip 111 as illustrated in FIG. 2I.

In some embodiments, the exemplary pad 110 illustrated in FIG. 2I may further comprise the pad grip 111 detachably coupled to or integrated into a portion of the transparent touch part 117 or a portion of the touch part frame 124.

In some embodiments, at least a portion of the exemplary extension portions 122 extending from the pad tracking part 113 may be connected to the touch part frame 124 or the transparent touch part 117 or the pad tracking part 113.

Figure 2J:
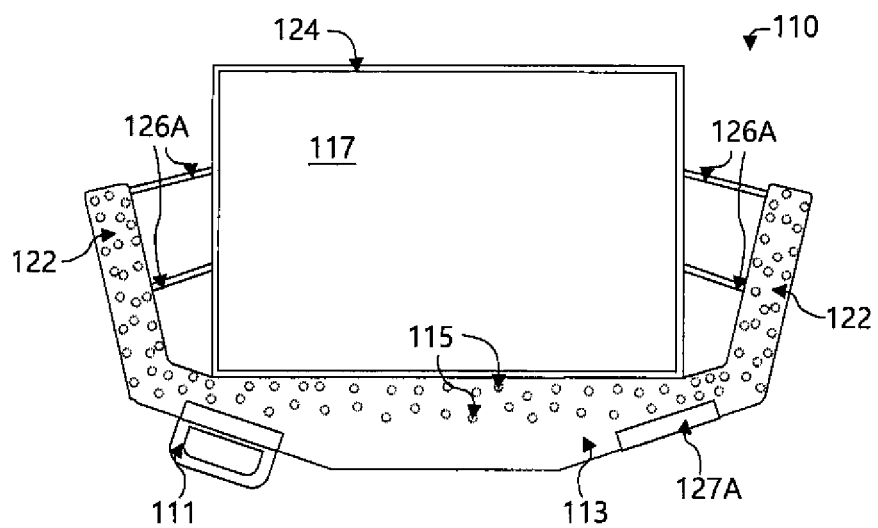
Figure 2K:
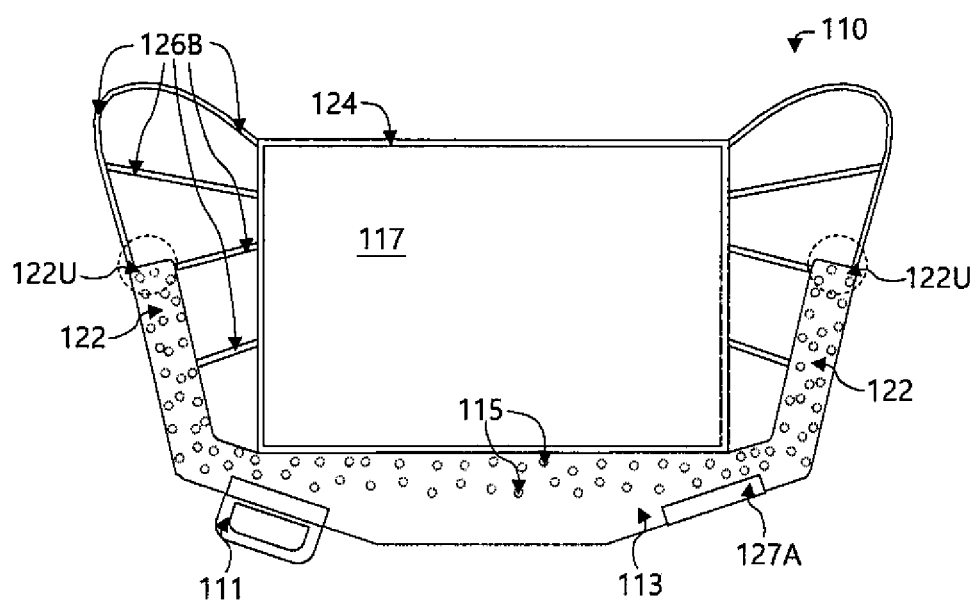

In some embodiments, the exemplary extension portions 122 extending from the pad tracking part 113 may be connected to the touch part frame 124 or the transparent touch part 117 or the pad tracking part 113 by one or more support frames 126A or 126B to prevent the transparent touch part 117 from being deformed by its own weight or external stress applied by the VR user as illustrated in FIGS. 2J and 2K.

In some embodiments, when the longitudinal length of the extension portions 122 extending from the pad tracking part 113 does not reach the length of the longitudinal side of the transparent touch part 117, the support frames 126B may extend in a longitudinal direction of the extension portions 122 from the upper sections 122U or a portion of the extension portions 122, and may be connected to the touch part frame 124 or the transparent touch part 117 as illustrated in FIG. 2K.

In some embodiments, the support frames 126A or 126B may be detached from or integrated into the touch part frame 124 or the transparent touch part 117 or the pad tracking part 113 or the extension portions 122.

In some embodiments, the exemplary plurality of light sources 115 may be detachably disposed on or embedded under outside surfaces of the support frames 126A, 126B.

Figure 2L:
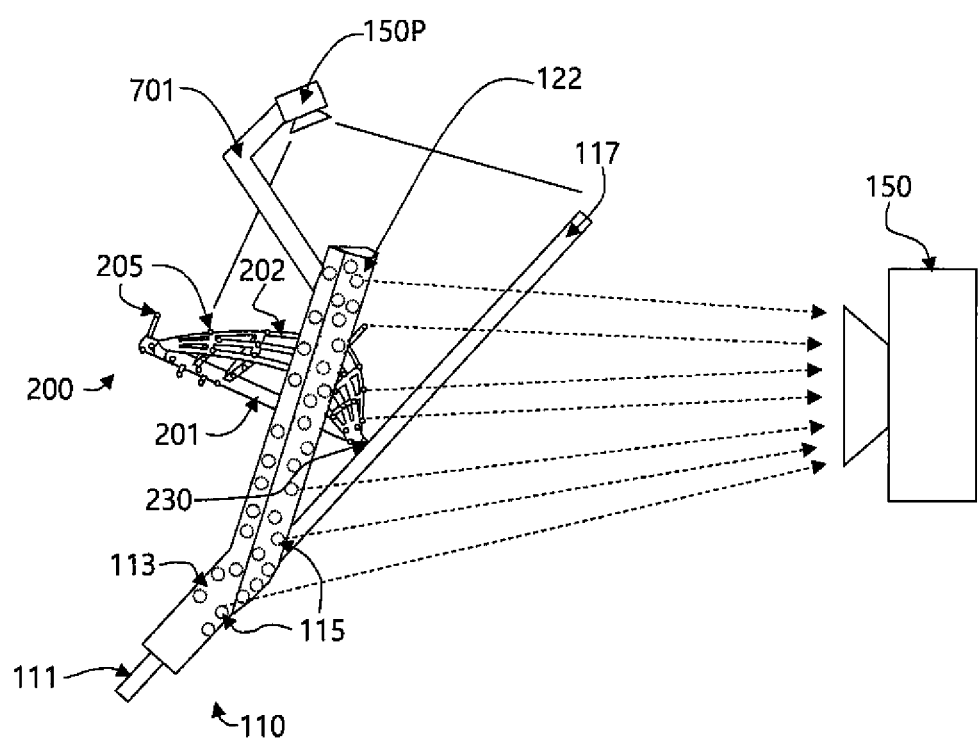

In some embodiments, the pad 110 may further comprise one or more cameras 150P detachably mounted to or integrated into one or more portions of the pad 110 including the pad tracking part 113, the transparent touch part 117, the touch part frame 124, and the pad grip 111 as illustrated in FIG. 2L. The cameras 150P may detect and track the plurality of light sources 205 disposed on the outside surface of the stylus pen 200.

In some embodiments, the cameras 150P may be mounted to one or more portions of the pad 110 including the pad tracking part 113, the transparent touch part 117, the touch part frame 124, and the pad grip 111, using one or more mounting accessories 701.

Figure 2M:
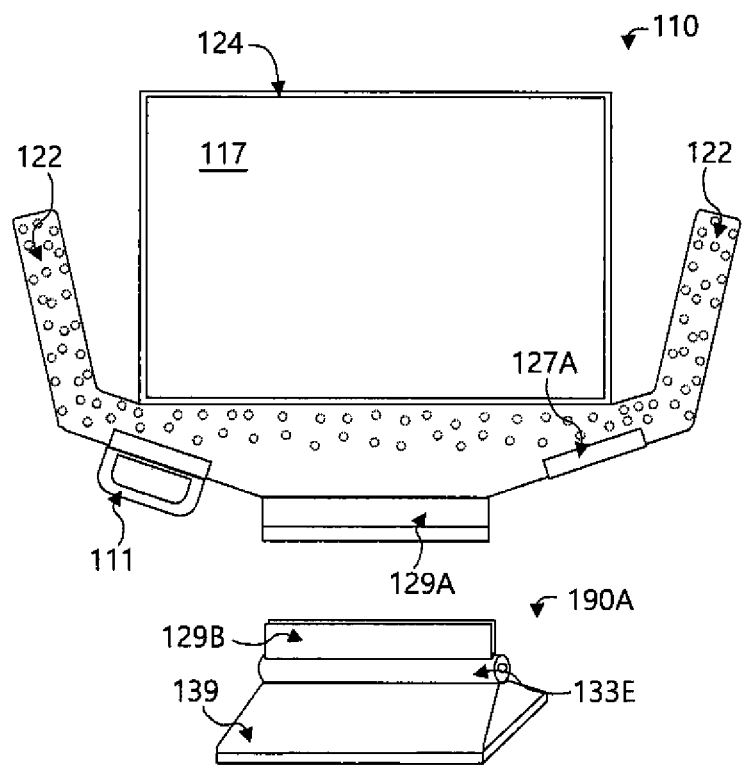

In some embodiments, the pad 110 may further comprise one or more accessories 190A that allows the pad 110 to be fixed onto a flat structure as illustrated in FIG. 2M. The accessories 190A may comprise a flat-bottomed support 139, a hinge 133E coupled to the support 139 capable of changing the angle of the support 139 and the pad 110, and a mounting part 129B coupled to the hinge 133E that allows the hinge 133E to be connected to the pad 110. The pad 110 may further comprise a connecting part 129A for being coupled with the mounting part 129B.

Figure 2N:
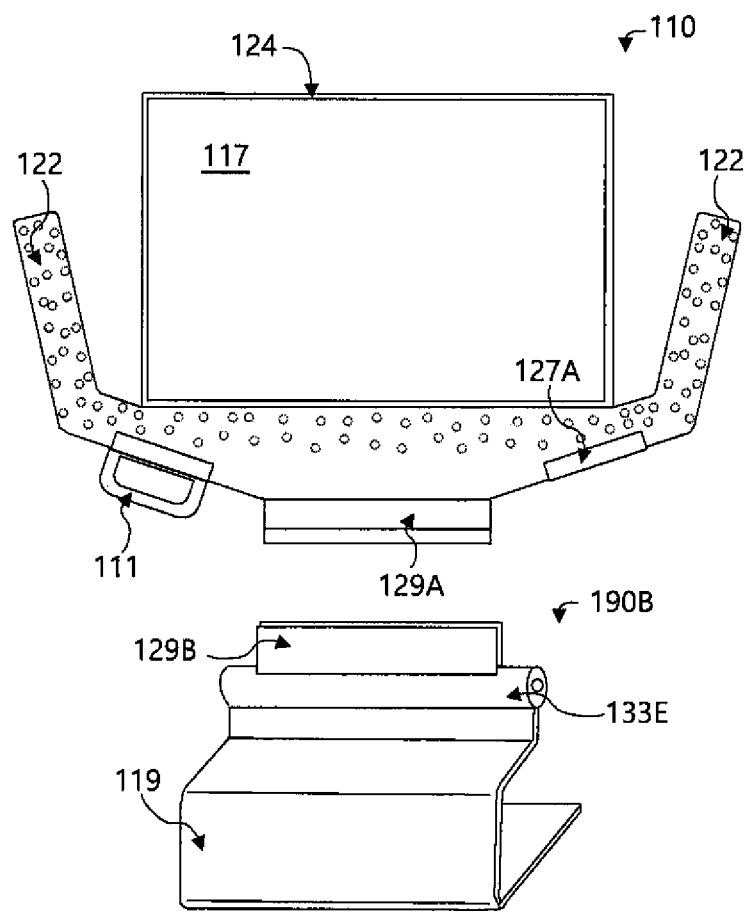
Figure 20:
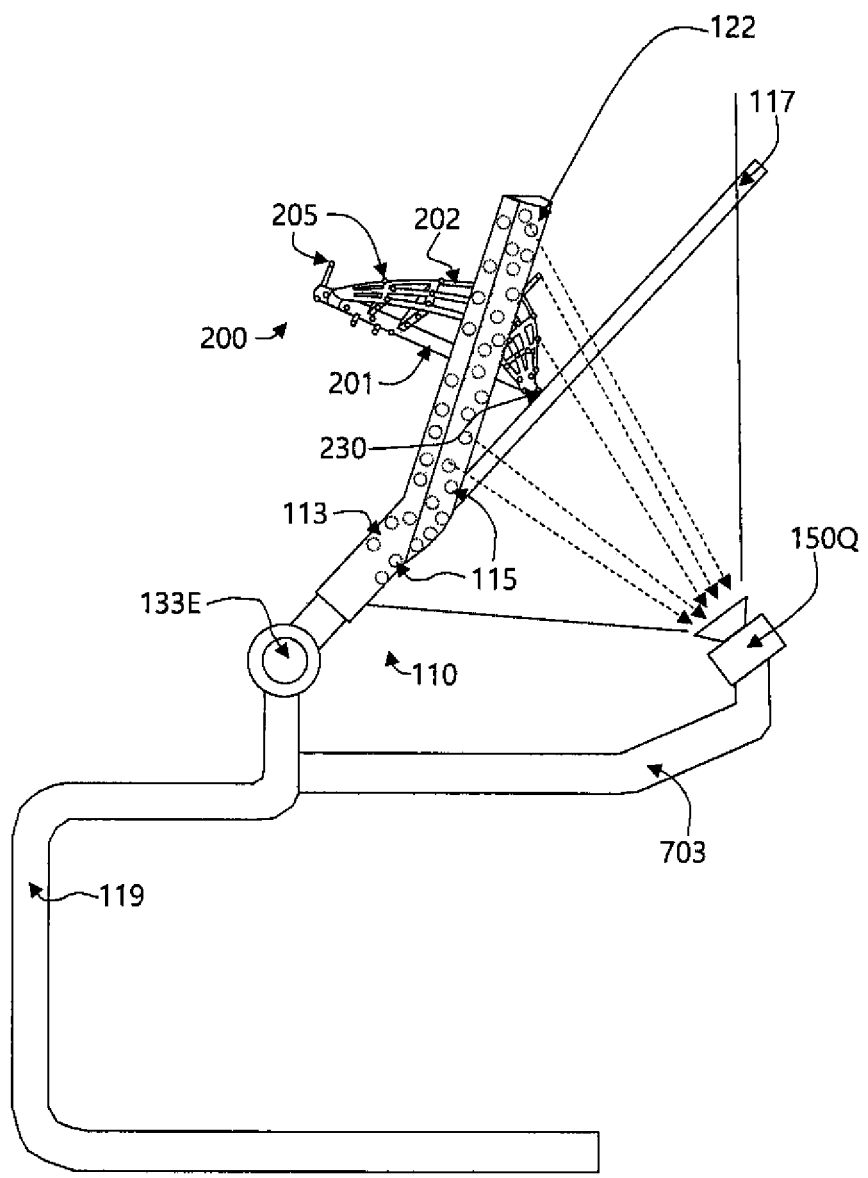
Figure 2P:
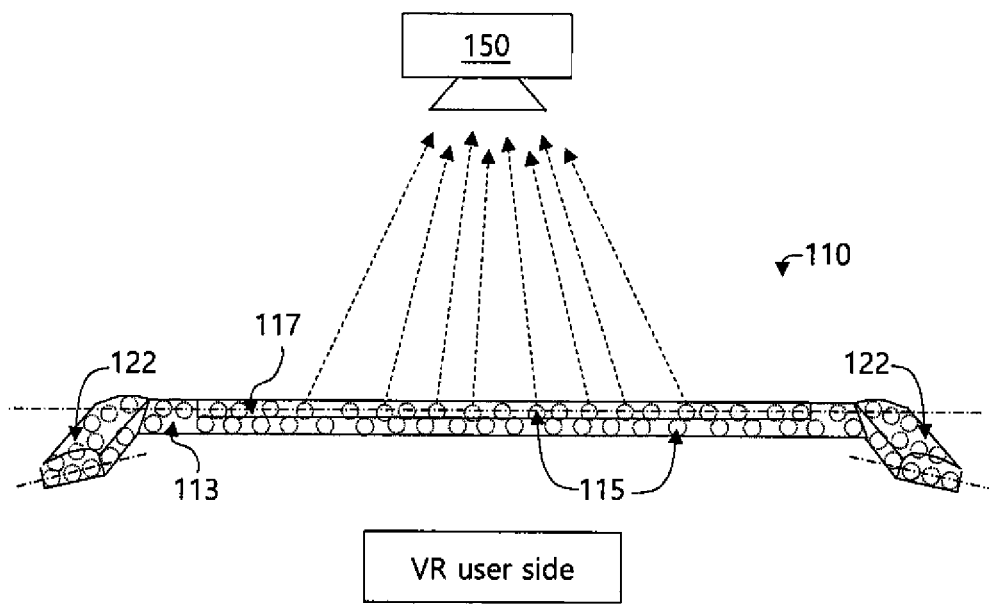

In some embodiments, the pad 110 may further comprise one or more accessories 190B that allow the VR user to put the pad 110 on his/her knee while the VR user is seated as illustrated in FIG. 2N. The accessories 190B may comprise a support 119, a hinge 133E coupled to the support 119 capable of changing the angle of the support 119 and the pad 110, and a mounting part 129B coupled to the hinge 133E that allows the hinge 133E to be connected to the pad 110. The pad 110 may further comprise a connecting part 129A for being coupled with the mounting part 129B.

In some embodiments, the support 119 may has a flat spring function to absorb and buffer tiny vibrations or shocks of the pad 110 shaking on the knee of the VR user.

In some embodiments, the support 119 may be horseshoe-shaped, and the open part of the horseshoe-shaped support 119 may be oriented toward the pad 110 or toward the opposite direction to the pad 110 or perpendicular to the pad 110 as illustrated in FIG. 2N.

In some embodiments, the accessories 190A may be integrated into the pad 110.

In some embodiments, the accessories 190A may not comprise the hinge E133.

In some embodiments, the accessories 190B may be integrated into the pad 110.

In some embodiments, the accessories 190B may not comprise the hinge E133 or the hinges E133.

In some embodiments, the plurality of light sources 115 may be detachably disposed on or embedded under outside surfaces of the accessories 190A or 190B.

In some embodiments, the accessories 190A or 190B may further comprise one or more inertial measurement units including a gyroscope sensor, an accelerometer and/or a magnetometer.

In some embodiments, the pad 110 may further comprise one or more cameras 150Q mounted to the exemplary support 119 as illustrated in FIG. 2O. The cameras 150Q may detect and track the plurality of light sources 115, 205 disposed on the outside surfaces of the stylus pen 200 and the pad 110.

In some embodiments, the cameras 150Q may be detachably mounted to or integrated into the support 119.

In some embodiments, the cameras 150Q may be mounted to the support 119, using one or more mounting accessories 703.

Figure 6A:
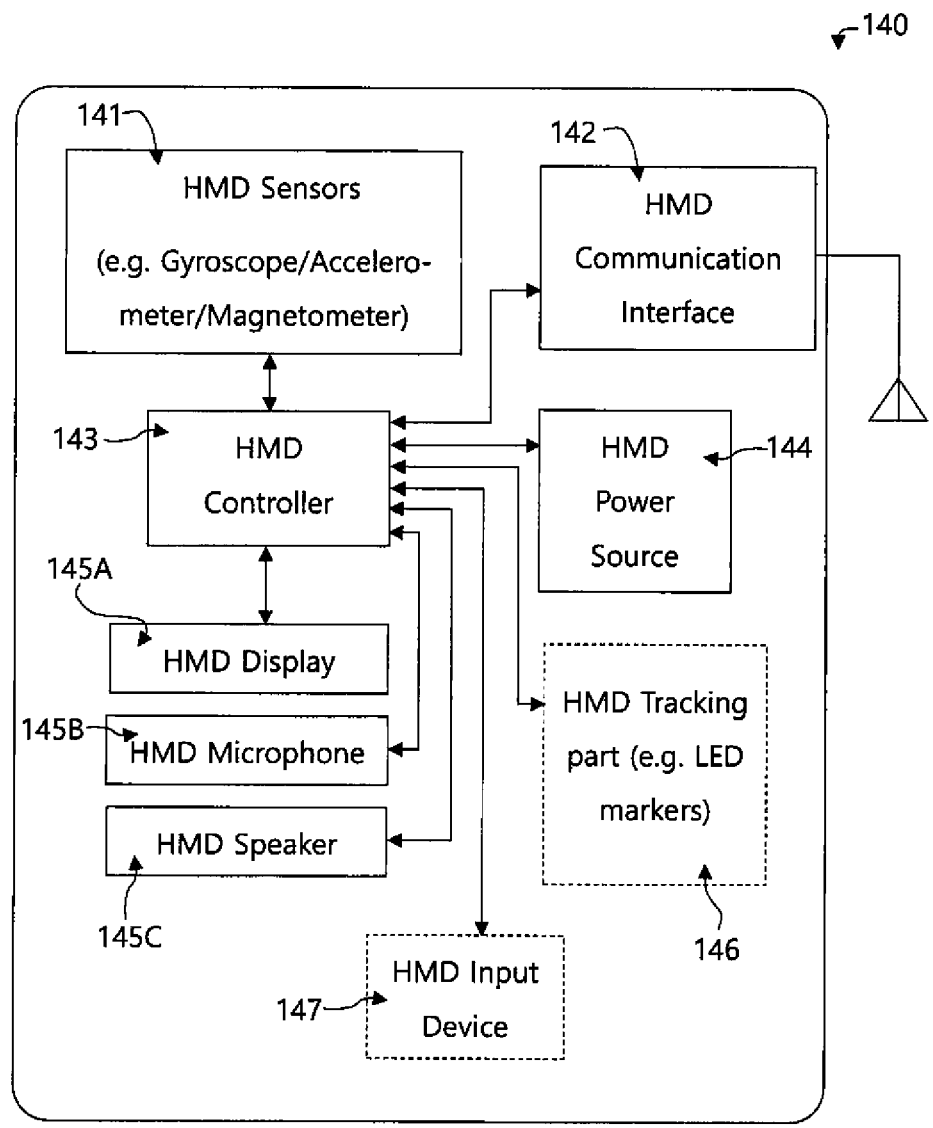
FIG. 6A is a block diagram showing an exemplary illustrative configuration of a VR HMD of the exemplary virtual reality systems.
Figure 6B:
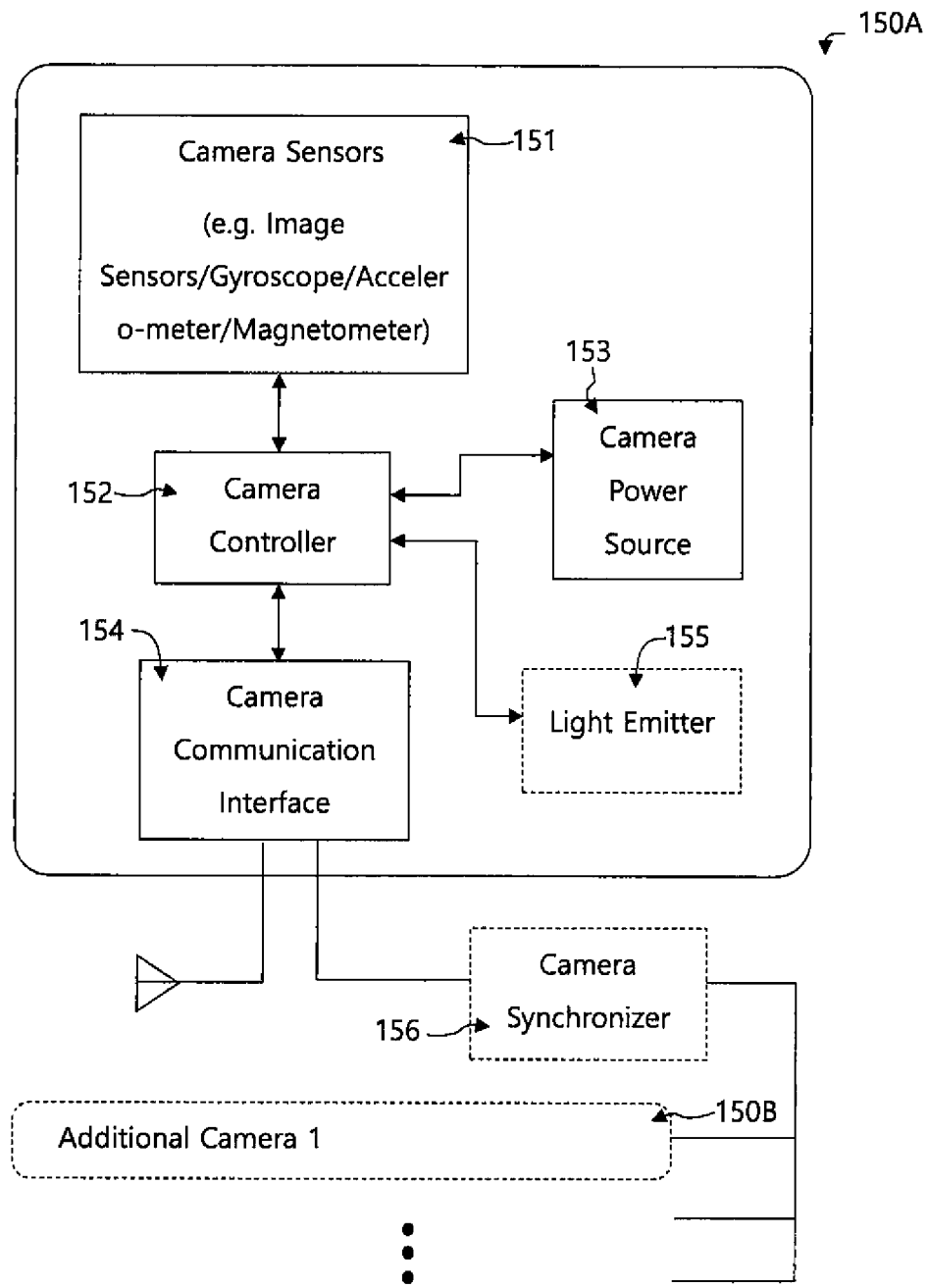
FIG. 6B is a block diagram showing an exemplary illustrative configuration of external cameras of the exemplary virtual reality systems.
Figure 6C:
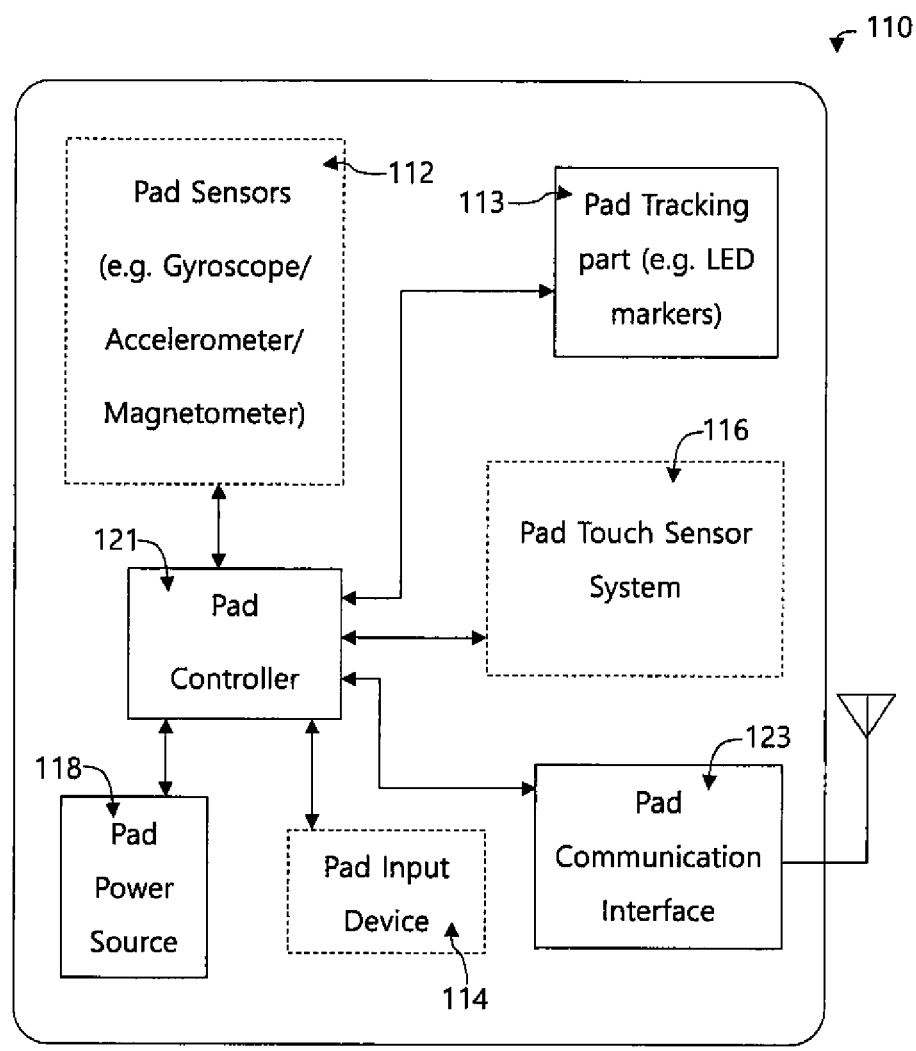
FIG. 6C is a block diagram showing an exemplary illustrative configuration of a pad of the exemplary VR user interface devices.

In some embodiments, each of the pads 110 illustrated in FIG. 2A-2O may further comprise a pad touch sensor system 116 illustrated in FIG. 6C for sensing a touch of the stylus pen 200 and determining the location of the touch in the transparent touch part 117 area.

In some embodiments, the pad touch sensor system 116 may comprise a transparent touch sensor layer coupled to the surface of the transparent touch part 117.

In some embodiments, the transparent touch sensor layers may comprise the structures of circuits such as resistive touch layers or electrostatic capacitive touch layers or electromagnetic resonance coupling wirings.

In some embodiments, the exemplary resistive touch layers or the exemplary electrostatic capacitive touch layers may comprise a plurality of transparent conductive electrodes and a plurality of transparent insulating layers.

In some embodiments, the electromagnetic resonance coupling wirings may comprise a plurality of circuit wirings.

In some embodiments, the exemplary transparent conductive electrodes may comprise transparent conductive materials such as ITO (Indium Tin Oxide) or Graphene, for passing light through the transparent touch sensor layer.

In some embodiments, the exemplary plurality of circuit wirings may comprise a plurality of metal wires thin enough to pass light through the transparent touch sensor layer.

In some embodiments, the pad touch sensor system 116 may comprise an optical system (e.g. infrared rays detecting system) including a plurality of light emitters and a plurality of photo detective sensors.

In some embodiments, the pad touch sensor system 116 may comprise a surface acoustic wave system including one or more transducers that emit acoustic waves, one or more reflectors that guide acoustic waves to a desired direction, and one or more sensors that detect acoustic waves.

In some embodiments, the optical system or the surface acoustic wave system may be mounted at the transparent touch sensor layer or the transparent touch part 117 or the pad tracking part 113 or the touch part frame 124.

In some embodiments, each of the pads 110 illustrated in FIG. 2A-2O may further comprise one or more inertial measurement units including a gyroscope sensor, an accelerometer, and/or a magnetometer.

In some embodiments, each of the pads 110 illustrated in FIG. 2A-2O may further comprise one or more input devices 114 for activating application programs or the various function of the application programs, on one or more portions of the pad 110 including the pad grip 111, the pad tracking part 113, the transparent touch part 117, and the touch part frame 124. For example, if the input devices 114 are turned on or turned off, the specific functions of the exemplary VR contents displayed on the rendered pad or VR contents displayed in a virtual reality space are activated or deactivated and then the results are implemented on the rendered pad or in the virtual reality space.

In some embodiments, the specific functions may be actions such as a selecting or image-capturing or menu floating.

FIG. 2P-2S illustrate some implementations of pads 110 of the exemplary VR user interface devices being tracked by the exemplary external cameras 150 or 150A and 150B as viewed from above. A plurality of light sources 115 disposed on an outside surface of a pad tracking part 113 may be arranged to be at least partially detected by the exemplary external cameras 150 or 150A and 150B when a VR user garbs and handles the pads 110.

Figure 2Q:
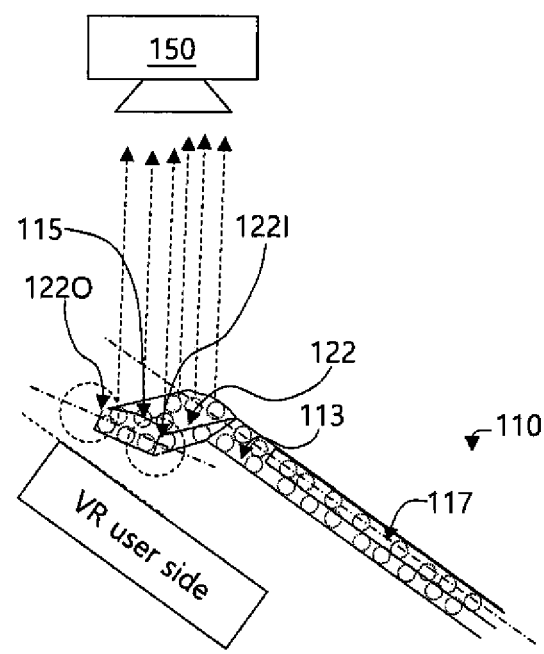
Figure 2R:
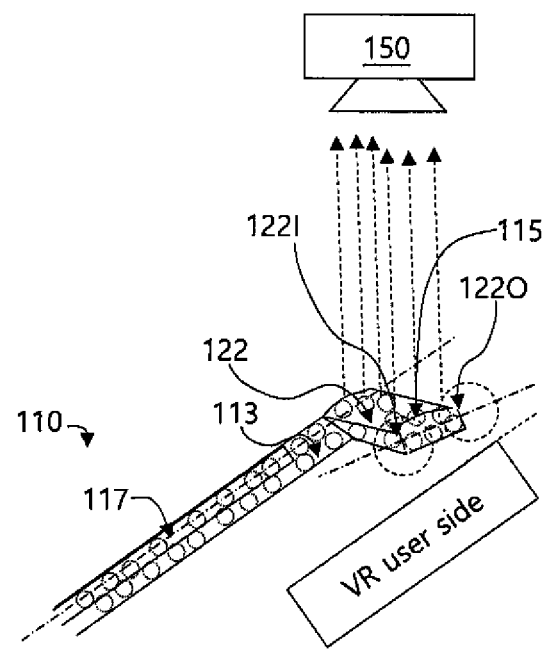

In some embodiments, the exemplary extension portions 122 extending from the pad tracking part 113 may be inclined at an angle with respect to the transparent touch part 117 such that outer sections 1220 of the extension portions 122 are closer to a VR user side than inner sections 1221 of the extension portions 122, and the surfaces of the opposite side of a VR user side of the extension portions 122 are curved convexly as illustrated in FIG. 2P-2S, when viewed from the upper side of the pad 110. The plurality of light sources 115 may be distributed and arranged in both of the outer sections 1220 and the inner sections 1221 of the extension portions 122, and disposed on outside surfaces of both of the portions 1220, 1221 as illustrated in FIG. 2Q-2R. When the exemplary external cameras 150 or 150A and 150B are positioned in front of the pad 110 and the pad 110 rotates clockwise or counterclockwise around the longitudinal axis of the pad 110, the projected area of the array of the plurality of light sources 115 disposed on the outside surface of the pad tracking part 113 onto the image sensors 151S of the exemplary external cameras 150 or 150A and 150B rapidly decreases, making it difficult to accurately derive the attitude and the position of the pad 110. The inclined and curved form of the portion 122 and the distribution of the plurality of light sources 115 in the portion 122 increase the projected area, making it possible to accurately derive the attitude and the position of the pad 110 as illustrated in FIGS. 2Q and 2R.

Figure 2S:
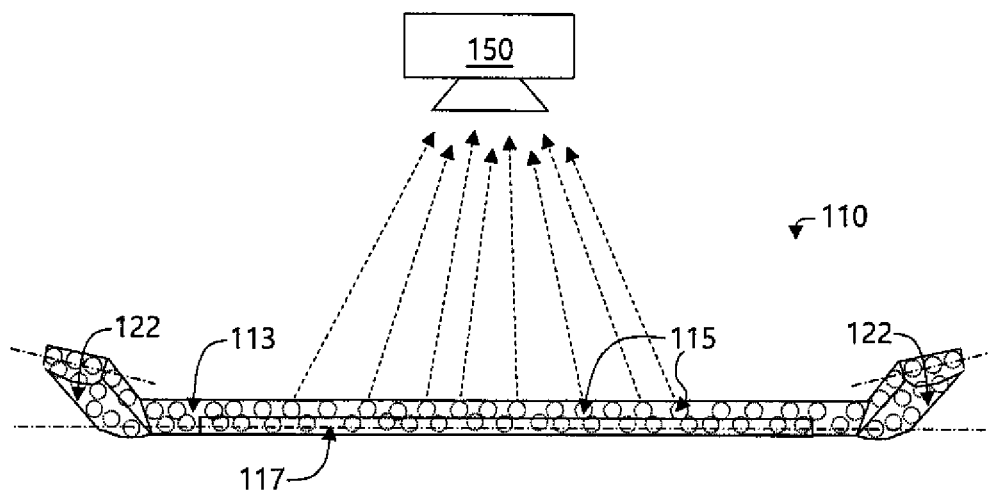

In some embodiments, the plurality of light sources 115 may be disposed on an outside surface of the pad tracking part 113 in the direction of the touch surface of the transparent touch part 117 so that the pad 110 can be detected by the exemplary external cameras 150 or 150A and 150B when the pad 110 is placed in an arbitrary attitude without being handled by a VR user as illustrated in FIG. 2S.

In some embodiments, the plurality of light sources 115 may be disposed on outside surfaces of the transparent touch part 117 or the pad grip 111 or the touch part frame 124 or the support frames 126A, 126B, in the direction of the touch surface of the transparent touch part 117.

Figure 3A:
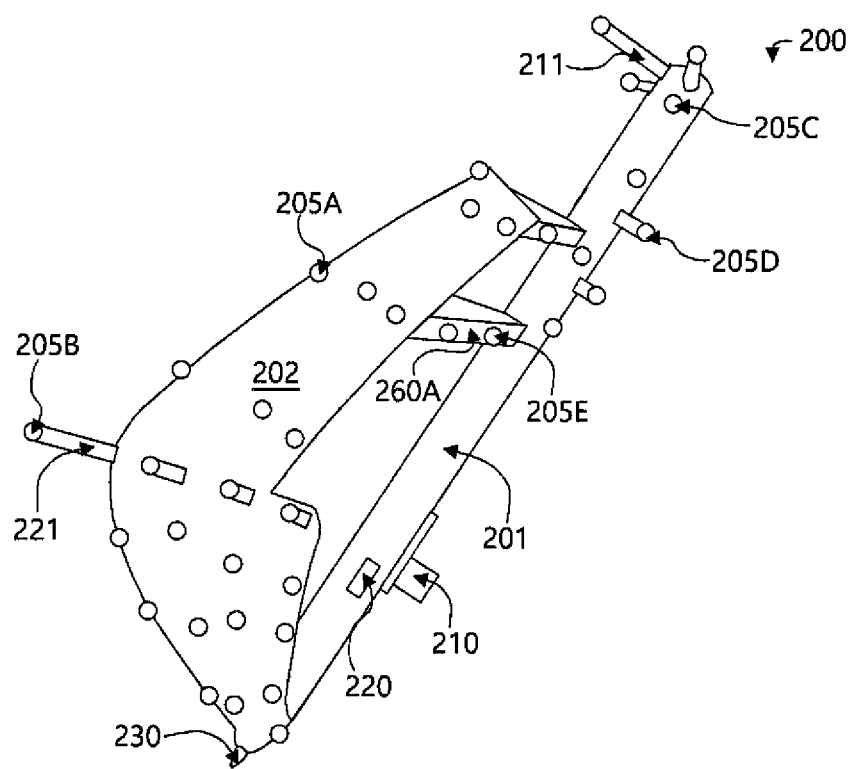
FIG. 3A-3P illustrate some implementations of stylus pens of the exemplary VR user interface devices.
Figure 3B:
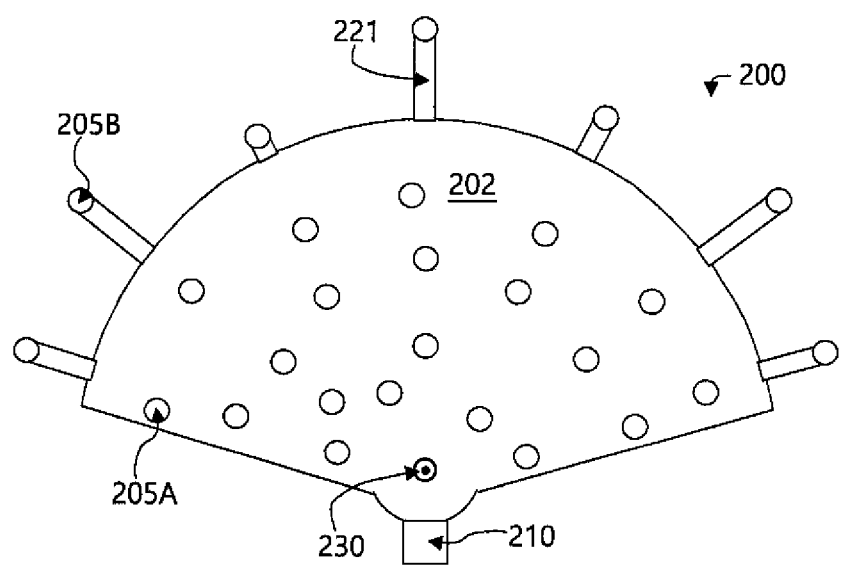
Figure 3C:
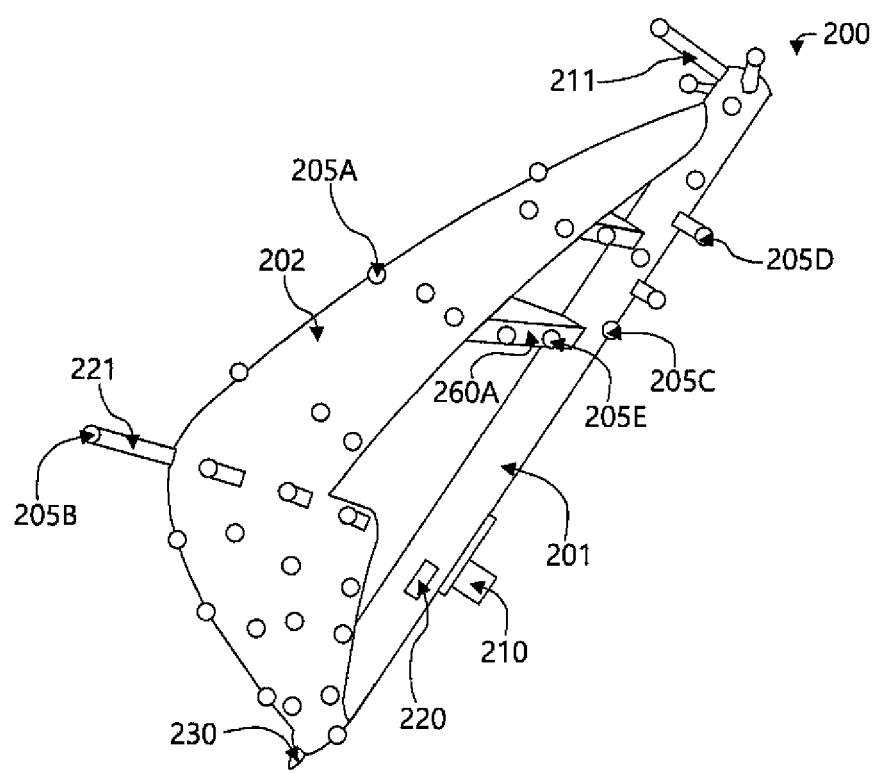
Figure 3D:
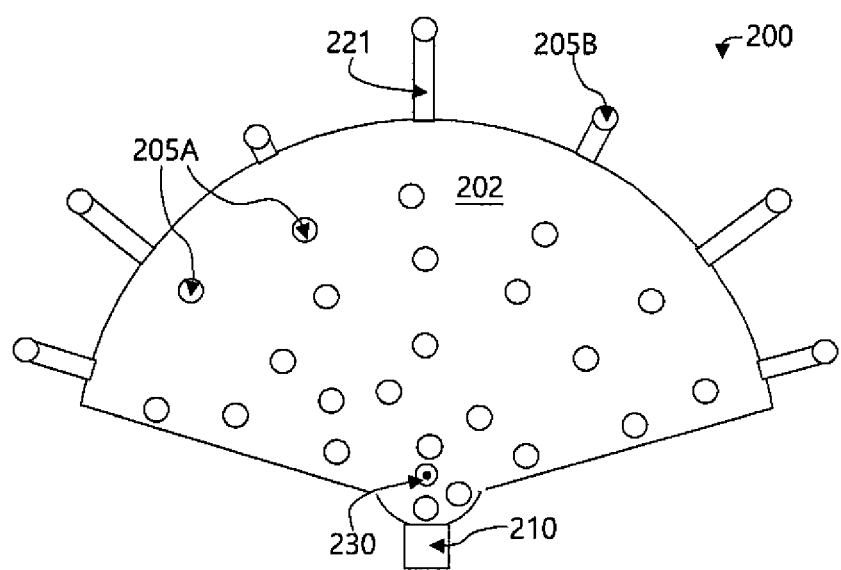
Figure 3E:
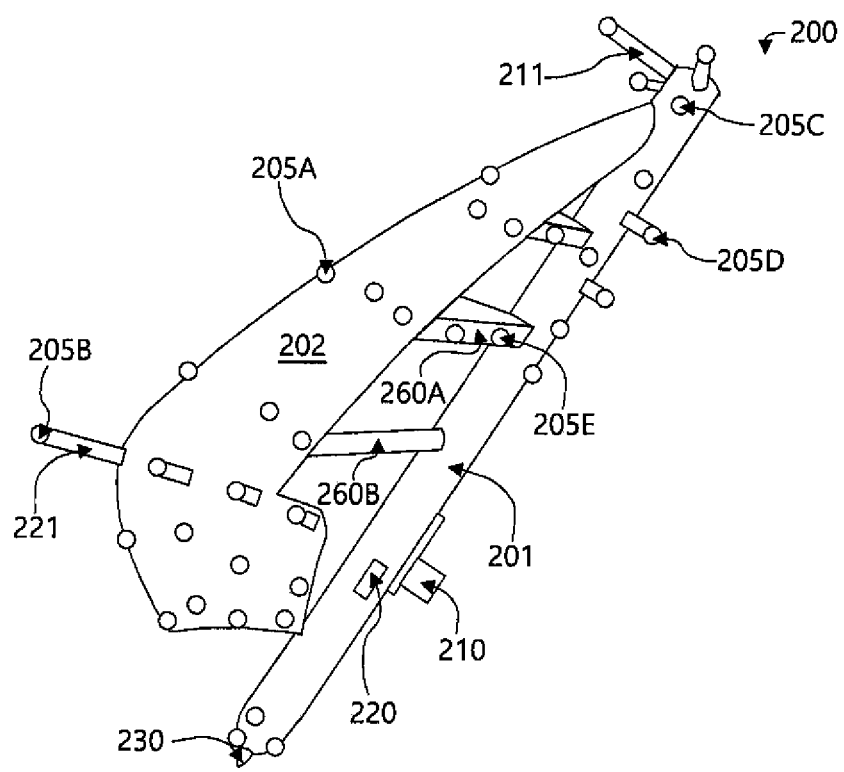
Figure 3F:
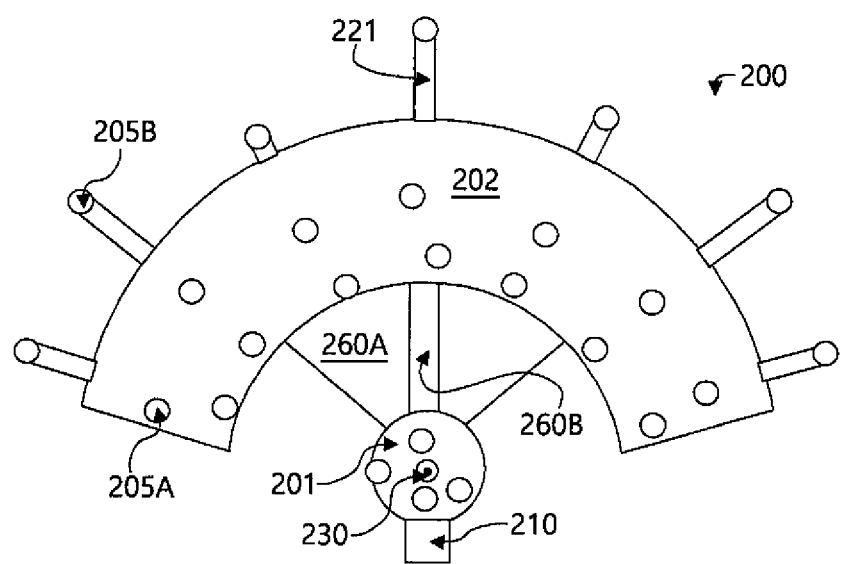
Figure 3G:
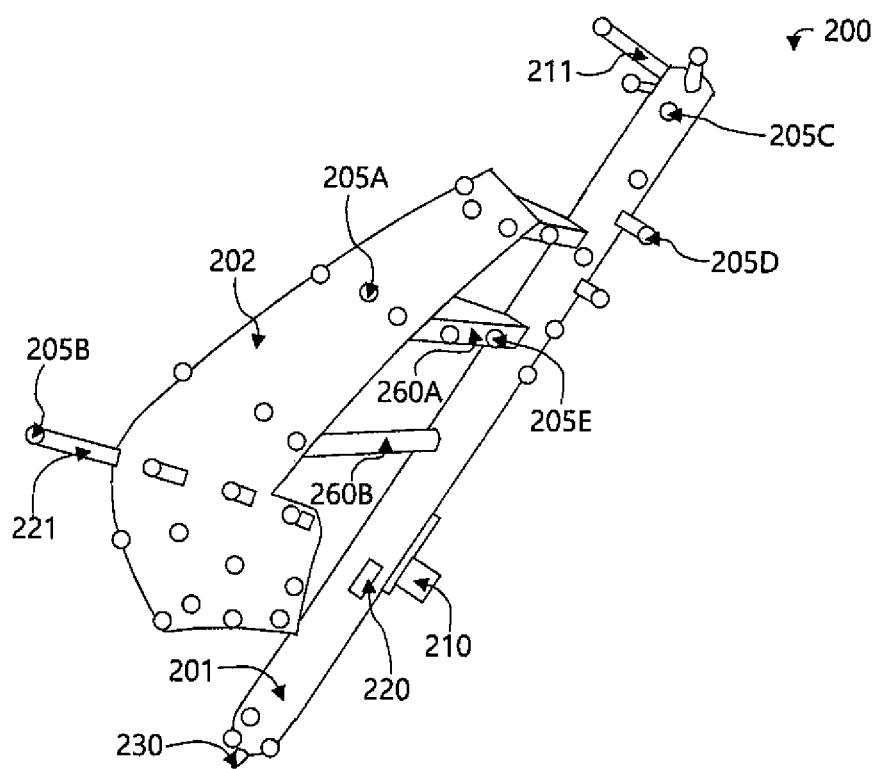
Figure 3H:
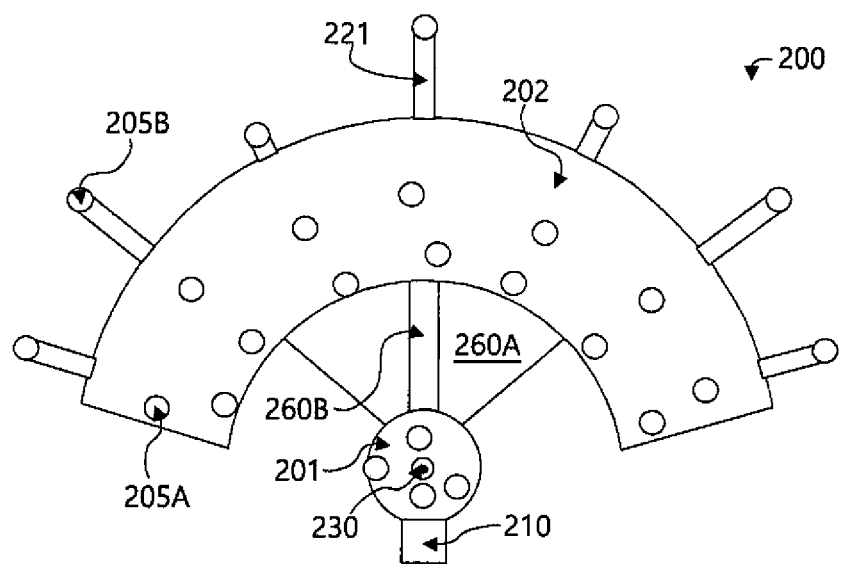
Figure 31:
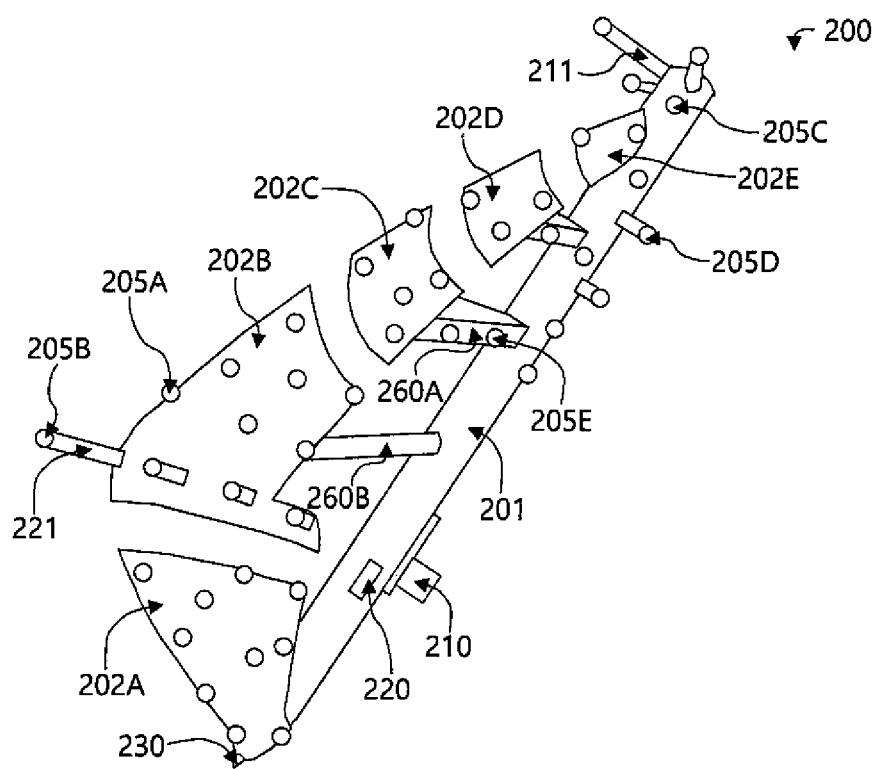
Figure 3J:
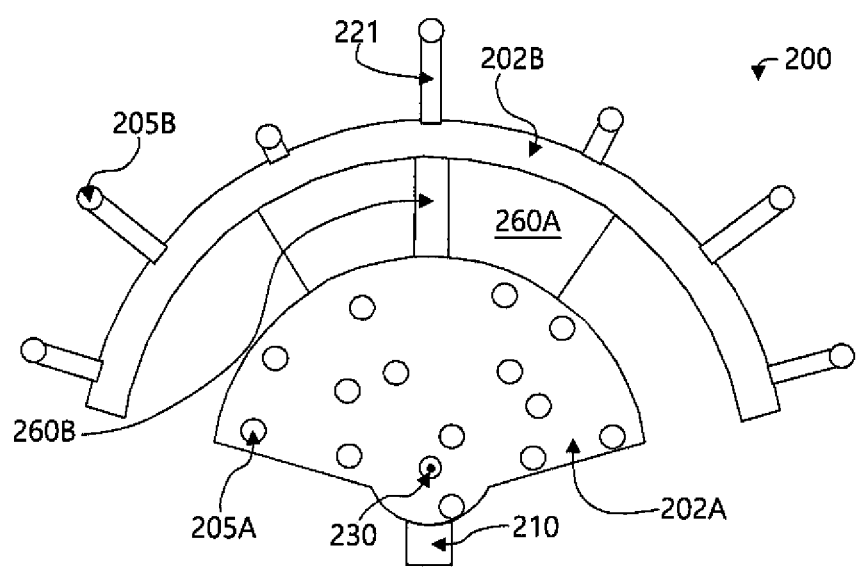
Figure 3K:
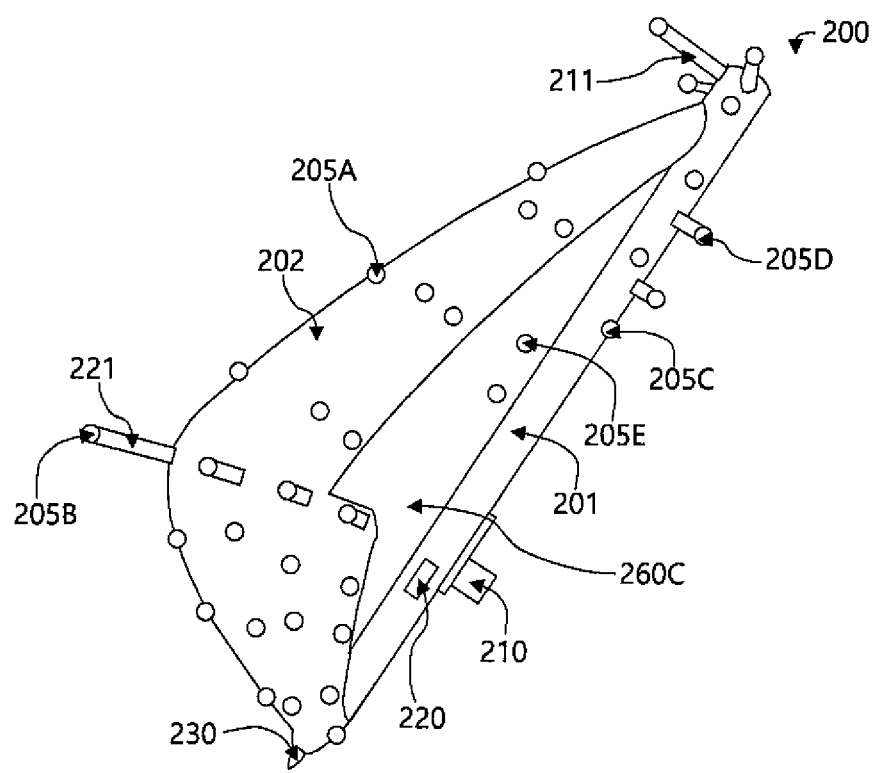
Figure 3L:
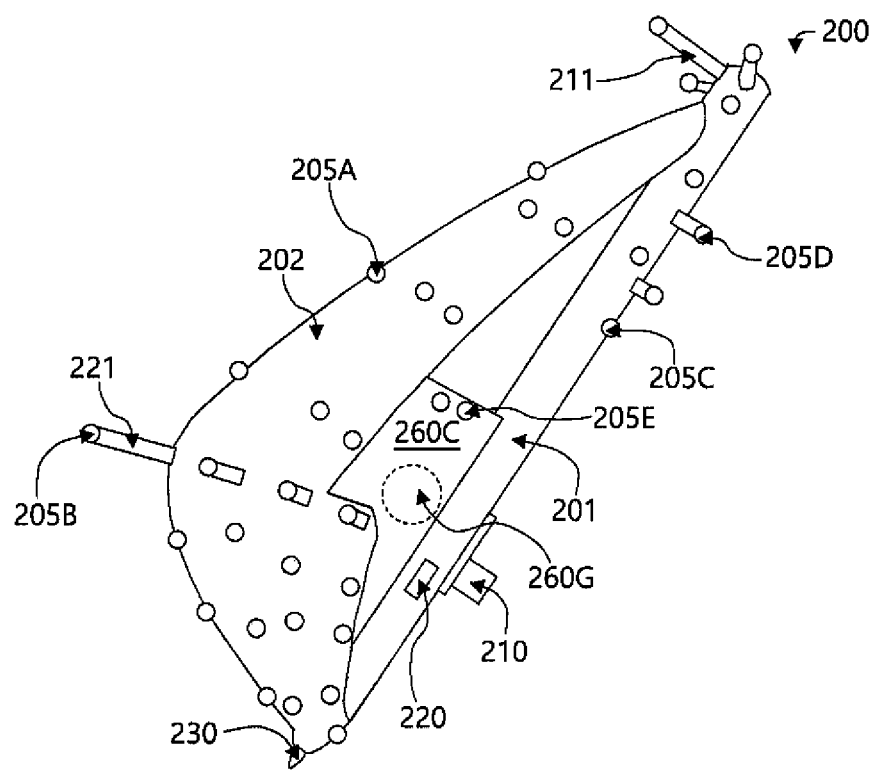
Figure 3M:
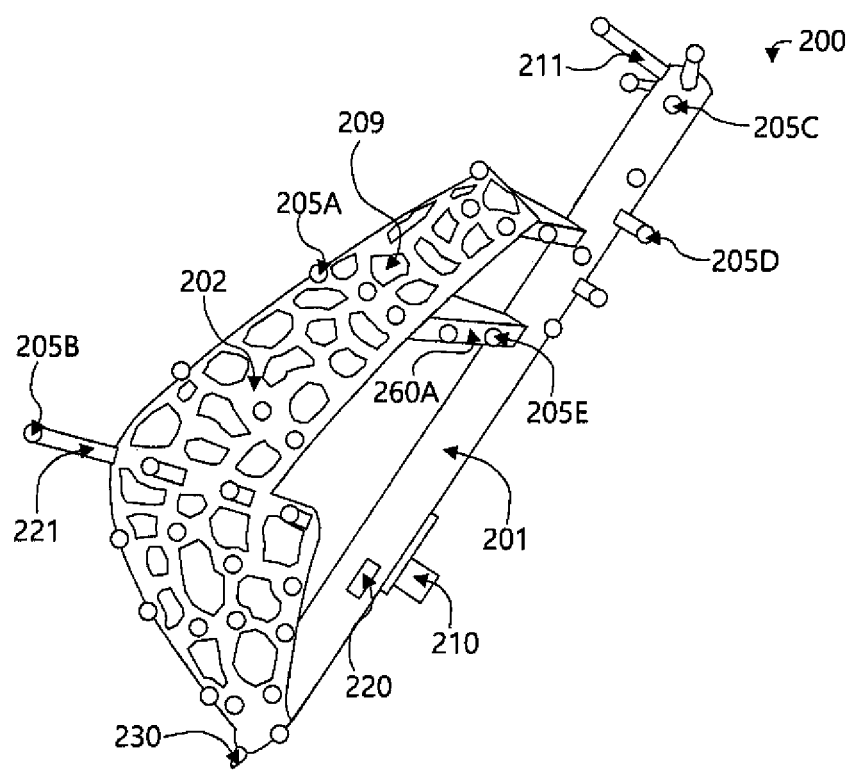
Figure 3N:
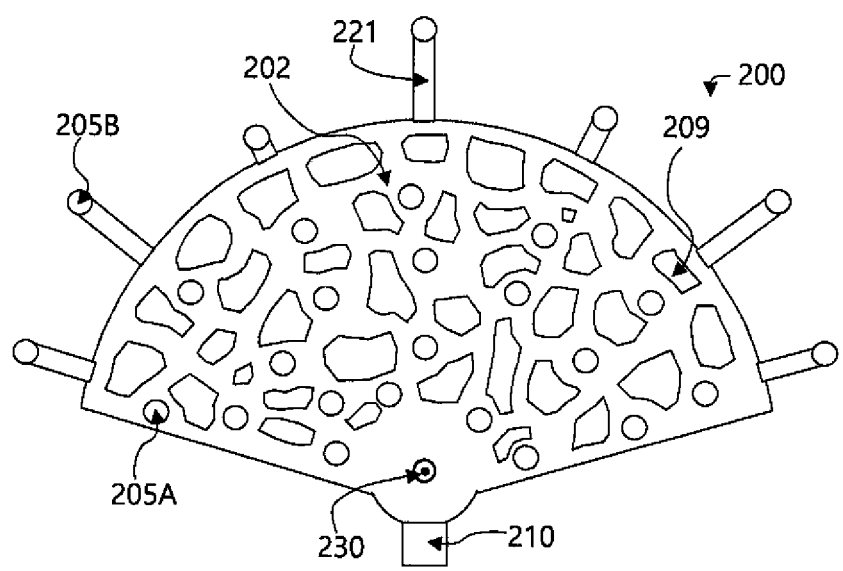
Figure 30:
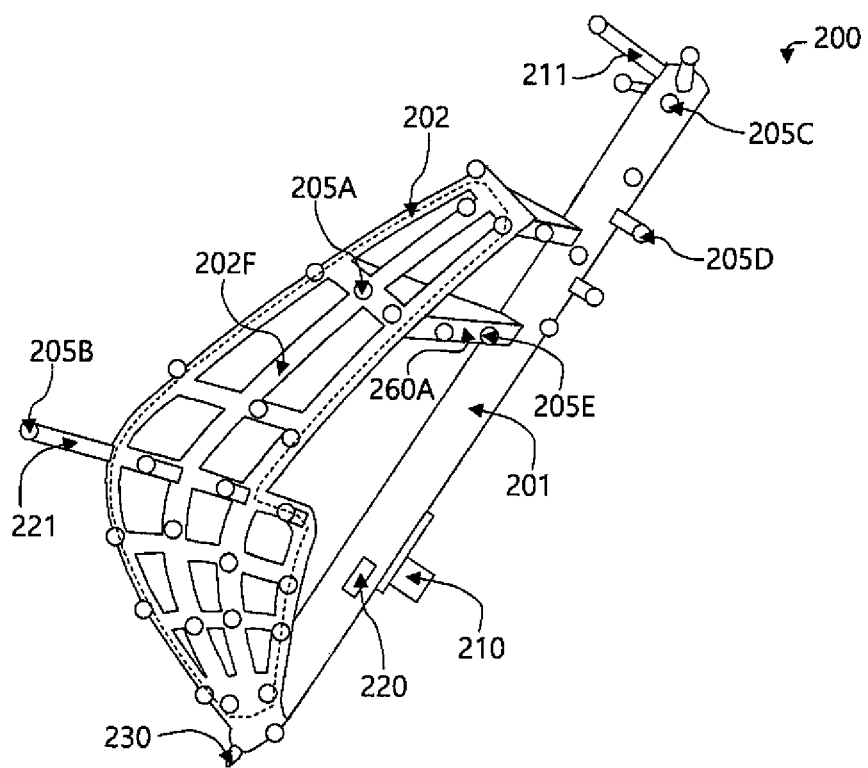
Figure 3P:
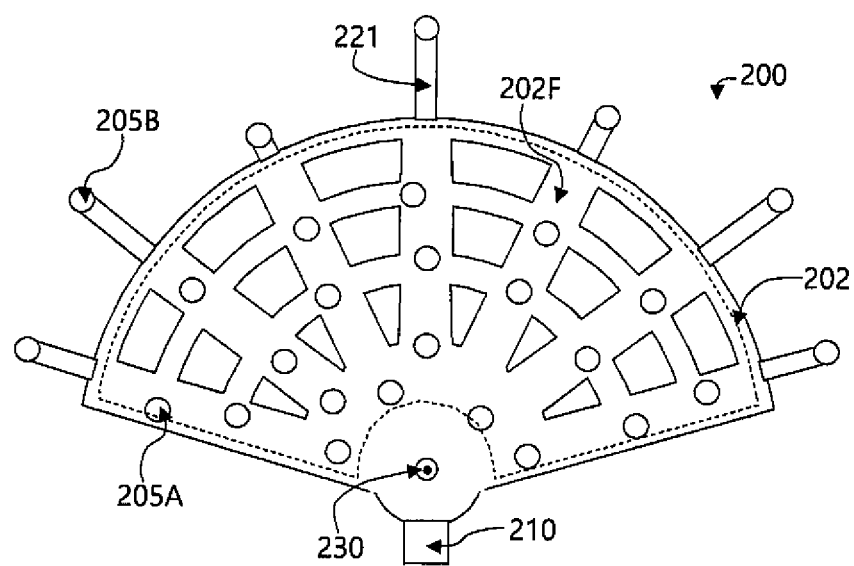

FIG. 3A-3P illustrate some implementations of stylus pens 200 of the exemplary VR user interface devices. The stylus pens 200 each generally comprise a stylus grip 201, a stylus tip 230 detachably mounted to or integrated into the stylus grip 201, a stylus tracking part 202 detachably coupled to or integrated into the stylus grip 201, and a plurality of light sources 205 comprising the light emitting diodes or the infrared light emitting diodes or the passive reflective markers or the photo detective sensors detachably disposed on or embedded under an outside surface of the stylus tracking part 202. The plurality of light sources 205 may be set to emit light or reflect light or detect light.

In some embodiments, the stylus tracking part 202 may be detachably coupled to or integrated into a first section of the stylus grip 201, and the index finger and the thumb of a VR user holding the stylus grip 201 may be placed behind the first section of the stylus grip 201 as illustrated in FIGS. 3A and 3B. The first section of the stylus grip 201 is the stylus grip 201 area between the stylus grip 201 boundary with a distance of 1 mm from the stylus tip 230 and the stylus grip 201 boundary with a distance of 70 mm from the stylus tip 230.

In some embodiments, the stylus tracking part 202 may be detachably coupled to or integrated into a second section of the stylus grip 201 as illustrated in FIGS. 3E and 3F. The second section of the stylus grip 201 is the stylus grip 201 area between the stylus grip 201 boundary with a distance of 25 mm from the stylus tip 230 and the end of the stylus grip 201 opposite the stylus tip 230.

In some embodiments, the stylus tracking part 202 may be detachably coupled to or integrated into the first section of the stylus grip 201 and the second section of the stylus grip 201, and the stylus tracking part 202 may extend from the first section of the stylus grip 201 to the second section of the stylus grip 201 above the index finger and the thumb of the VR user holding the stylus grip 201 as illustrated in FIGS. 3C and 3D.

In some embodiments, the stylus pen 200 may further comprise one or more support fixtures 260A, 260B detachably coupled to or integrated into the stylus grip 201 area between the stylus grip 201 boundary with a distance of 2 mm from the stylus tip 230 and the end of the stylus grip 201 opposite the stylus tip 230. The support fixtures 260A, 260B may be detachably coupled to or integrated into the stylus tracking part 202 at the ends opposite the ends of the support fixtures 260A, 260B that are coupled to the stylus grip 201 and the stylus tracking part 202 may not be coupled directly to the stylus grip 201 as illustrated in FIGS. 3G and 3H.

In some embodiments, each of the exemplary stylus tracking parts 202 illustrated in FIG. 3A-3H may comprise a plurality of separated stylus tracking parts 202A-202E and one or more support fixtures 260A, 260B may be detachably coupled to or integrated into the stylus grip 201 area between the stylus grip 201 boundary with a distance of 2 mm from the stylus tip 230 and the end of the stylus grip 201 opposite the stylus tip 230 and the support fixtures 260A, 260B may be detachably coupled to or integrated into the plurality of separated stylus tracking parts 202A-202E at the ends opposite the ends of the support fixtures 260A, 260B that are coupled to the stylus grip 201 as illustrated in FIGS. 3I and 3J.

In some embodiments, each of the stylus pens 200 illustrated in FIG. 3A-3J may further comprise one or more support fixtures 260A, 260B detachably coupled to or integrated into the stylus grip 201 area between the stylus grip 201 boundary with a distance of 2 mm from the stylus tip 230 and the end of the stylus grip 201 opposite the stylus tip 230. The support fixtures 260A, 260B may be detachably coupled to or integrated into the stylus tracking part 202 at the ends opposite the ends of the support fixtures 260A, 260B that are coupled to the stylus grip 201.

In some embodiments, at least one of the exemplary support fixtures 260A or 260B illustrated in FIG. 3A-3J may extend from the stylus grip 201 boundary with a distance of 2 mm from the stylus tip 230 to the end of the stylus grip 201 opposite the stylus tip 230 as illustrated in FIG. 3K.

In some embodiments, each of the stylus pens 200 illustrated in FIG. 3A-3K may further comprise a support fixture 260C containing finger grip sections 260G on both sides of the support fixture 260C, and the finger grip sections 260G may be concave, and the support fixture 260C may be detachably coupled to or integrated into the stylus grip 201 area between the stylus grip 201 boundary with a distance of 2 mm from the stylus tip 230 and the end of the stylus grip 201 opposite the stylus tip 230, and the support fixture 260C may be detachably coupled or integrated into to the stylus tracking part 202 at the end opposite the end of the support fixture 260C that is coupled to the stylus grip 201 as illustrated in FIG. 3L.

In some embodiments, each of the exemplary stylus tracking parts 202 illustrated in FIG. 3A-3L may further comprise a plurality of void areas 209 in the inner area of the stylus tracking part 202, in order to improve the balance of the stylus pen 200 by reducing the weight of the stylus tracking part 202 as illustrated in FIG. 3M and FIG. 3N.

In some embodiments, each of the stylus tracking parts 202 illustrated in FIG. 3A-3L may further comprise a plurality of void areas 209 of the same geometry that are repeatedly formed in the inner area of the stylus tracking part 202.

In some embodiments, each of the stylus tracking parts 202 illustrated in FIG. 3A-3L may further comprise a plurality of void areas 209 of various geometric shapes that are alternately formed in the inner area of the stylus tracking part 202.

In some embodiments, each of the stylus tracking parts 202 illustrated in FIG. 3A-3L may further comprise a plurality of void areas 209 of various geometric shapes that are randomly formed in the inner area of the stylus tracking part 202.

In some embodiments, each of the stylus tracking parts 202 illustrated in FIG. 3A-3L may comprise a skeletal structure formed by connecting a plurality of frames 202F together, in order to improve the balance of the stylus pen 200 by reducing the weight of the stylus tracking part 202 as illustrated in FIG. 3O and FIG. 3P.

In some embodiments, the skeletal structure may be formed by repetitively creating the same type of elemental structure made by connecting the plurality of frames 202F together.

In some embodiments, the skeletal structure may be formed by alternately creating various types of elemental structures made by connecting the plurality of frames 202F together.

In some embodiments, the skeletal structure may be formed by randomly creating various types of elemental structures made by connecting the plurality of frames 202F together.

In some embodiments, the plurality of light sources 205B, 205C, 205D, 205E illustrated in FIG. 3A-3P may be detachably disposed on or embedded under outside surfaces of portions of the stylus grip 201 or the support fixtures 260A, 260B, 260C or mounting accessories 221, 211 detachably coupled to or integrated into portions of the stylus tracking part 202 or the stylus grip 201 or the support fixtures 260A, 260B, 260C.

In some embodiments, the plurality of light sources 205 may be embedded in the stylus tip 230.

Figure 6D:
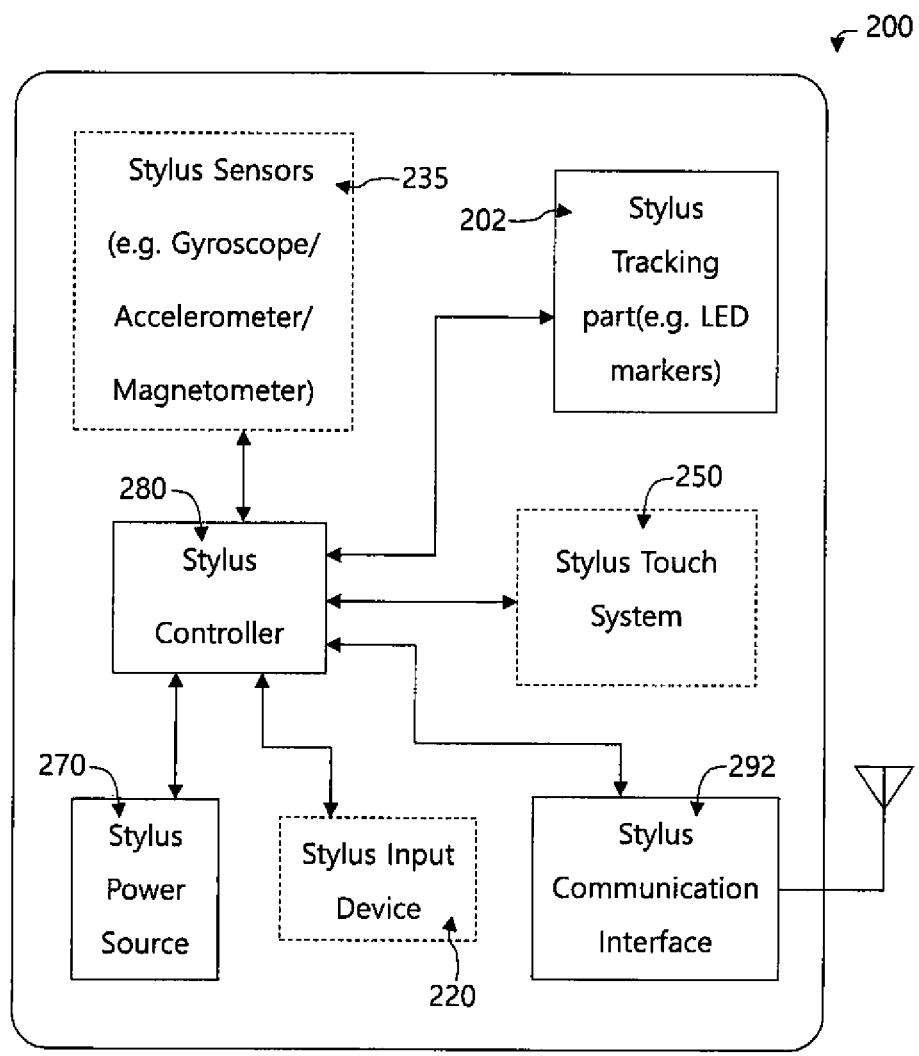
FIG. 6D is a block diagram showing an exemplary illustrative configuration of a stylus pen of the exemplary VR user interface devices.

In some embodiments, the stylus pen 200 may further comprise a stylus touch system 250 illustrated in FIG. 6D for sensing a touch of stylus tip 230 with the exemplary transparent touch part 117 or with the exemplary transparent touch sensor layer or for determining the location of the touch in the transparent touch part 117 area or the transparent touch sensor layer area.

In some embodiments, the stylus touch system 250 may comprise one or more pressure sensors such as piezoresistive sensors or piezoelectric sensors as referenced in WO2014188417110, the entire contents of which is hereby incorporated by reference.

In some embodiments, the exemplary pressure sensors may be strain gauges.

In some embodiments, the stylus touch system 250 may comprise a pressure sensitive system as referenced in US20150070330, the entire contents of which is hereby incorporated by reference.

In some embodiments, the stylus touch system 250 may comprise a contact switch device using stylus tip 230 as push button restored by a spring.

In some embodiments, the stylus touch system 250 may comprise the stylus tip 230 made of conductive materials or the stylus grip 201 made of conductive materials such as conductive plastic or conductive rubber or conductive silicon or conductive metals.

In some embodiments, the stylus touch system 250 may comprise a disk that is coupled to the stylus tip 230 by a ball or a spring.

In some embodiments, the stylus touch system 250 may comprise one or more circuits for generating the electromagnetic signal which can be coupled with the exemplary electrostatic capacitive touch layers included in the exemplary transparent touch sensor layer.

Figure 4A:
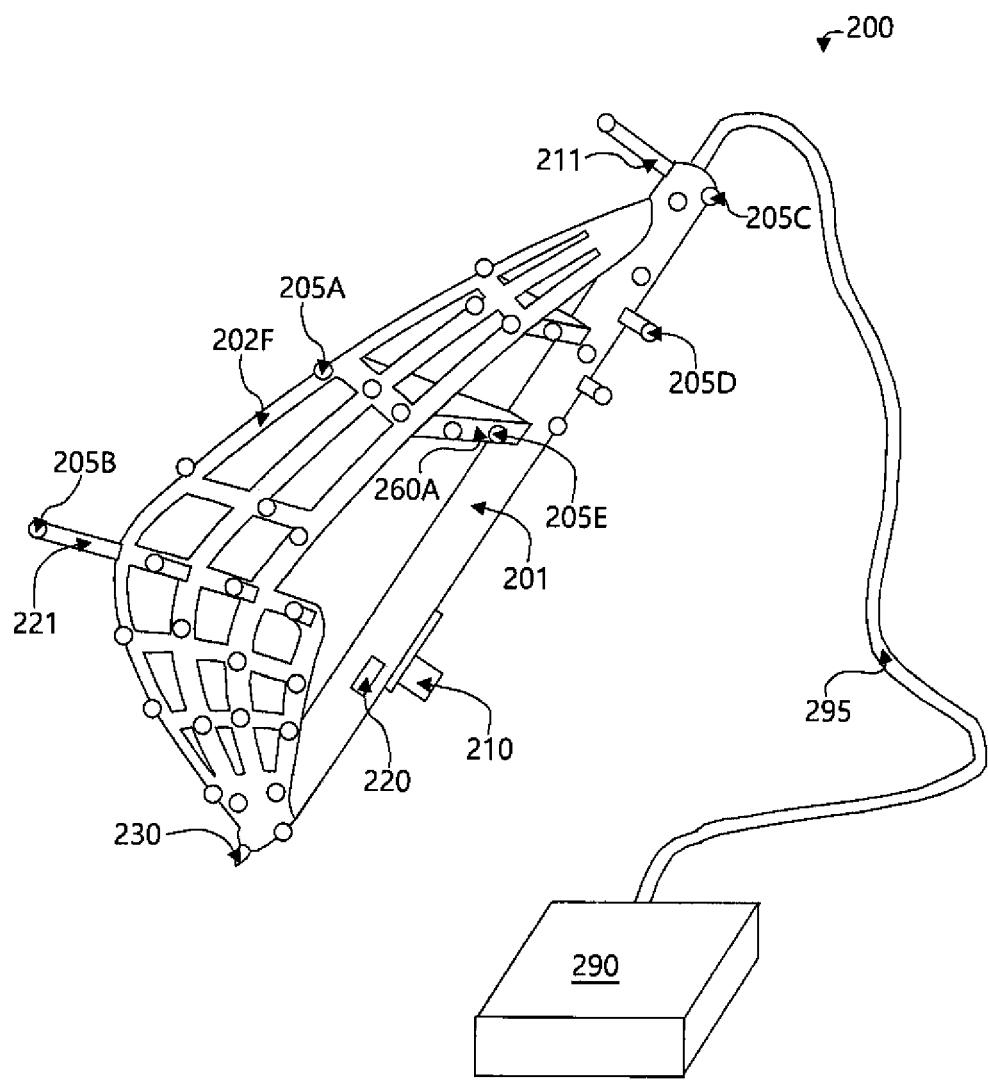
FIG. 4A illustrate an implementation of a stylus pen of the exemplary VR user interface devices comprising a stylus control unit wired to the exemplary stylus pen.
Figure 4B:
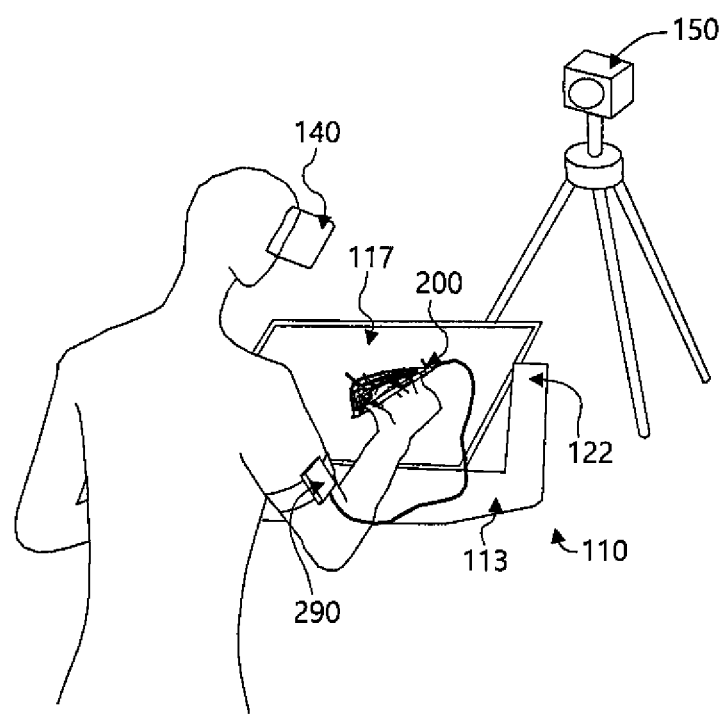
FIG. 4B illustrates an implementation of the exemplary VR user interface devices comprising the exemplary stylus control unit illustrated in FIG. 4A wired to the exemplary stylus pen.

In some embodiments, the circuits for generating the electromagnetic signal may be controlled by the stylus controllers 280 or controllers embedded in the stylus control unit 290 illustrated in FIG. 4A, FIG. 4B.

In some embodiments, the circuits for generating the electromagnetic signal may be powered by the stylus power sources 270 or power sources embedded in the stylus control unit 290 illustrated in FIG. 4A, FIG. 4B.

In some embodiments, the stylus touch system 250 may comprise one or more induction coils which can be coupled with the exemplary electromagnetic resonance coupling wirings included in the exemplary transparent touch sensor layers.

In some embodiments, each of the stylus pens 200 illustrated in FIG. 3A-3P may further comprise one or more input devices 220 for activating application programs or the various function of the application programs, on one or more portions of the stylus pen 200 including the stylus grip 201, the stylus tracking part 202, the support fixtures 260A, 260B, 260C, and the mounting accessories 221, 211. For example, if the input devices 220 are turned on or turned off, the specific functions of the exemplary VR contents displayed on the rendered pad or VR contents displayed in a virtual reality space are activated or deactivated and then the results are implemented on the rendered pad or in the virtual reality space.

In some embodiments, the specific functions may be actions such as a selecting or image-capturing or menu floating.

In some embodiments, each of the stylus pen 200 illustrated in FIG. 3A-3P may further comprise one or more inertial measurement units including a gyroscope sensor, an accelerometer, and/or a magnetometer.

In some embodiments, each of the stylus pens 200 illustrated in FIG. 3A-3P may further comprise one or more balance weights 210 for improving the balance of the stylus pen 200, on one or more portions of the stylus pen 200 including the stylus grip 201, the stylus tracking part 202, the support fixtures 260A, 260B, 260C, and the mounting accessories 221, 211.

FIG. 4A illustrate an implementation of a stylus pen 200 of the exemplary VR user interface devices comprising a stylus control unit 290 wired to the exemplary stylus pen 200. The stylus control unit 290 may be separated from the stylus pen 200 and wired electrically to the stylus pen 200, and the stylus control unit 290 may comprise one or more power source to supply power to the stylus pen 200 and one or more controller to control the stylus pen 200.

In some embodiments, one or more power source for supplying power to the stylus pen 200 may be built into the stylus control unit 290, and one or more controller for controlling the stylus pen 200 may be built into the stylus pen 200.

In some embodiments, one or more controllers for controlling the stylus pen 200 may be built into the stylus control unit 290, and one or more power source for supplying power to the stylus pen 200 may be built into the stylus pen 200.

In some embodiments, the stylus control unit 290 may further comprise one or more input devices for activating application programs or the various function of the application programs. For example, if the input devices are turned on or turned off, the specific functions of the exemplary VR contents displayed on the rendered pad or VR contents displayed in a virtual reality space are activated or deactivated and then the results are implemented on the rendered pad or in the virtual reality space.

In some embodiments, the specific functions may be actions such as a selecting or image-capturing or menu floating.

In some embodiments, the stylus control unit 290 may further comprise a communication interface for communicating wirelessly or by wire with the exemplary stylus pen 200 or the exemplary pad 110 or the exemplary VR HMD 140 or the exemplary external cameras 150 or 150A and 150B or other VR computer systems.

In some embodiments, the stylus pen 200 may further comprise one or more stylus control units 290.

FIG. 4B illustrates an implementation of the exemplary VR user interface devices comprising the exemplary stylus control unit 290 illustrated in FIG. 4A wired to the exemplary stylus pen 200. The stylus control unit 290 wired to the stylus pen 200 may be attached to a portion of a VR user's body while the VR user handles the stylus pen 200.

In some embodiments, the stylus control unit 290 may be attached to the exemplary VR HMD 140.

In some embodiments, the stylus control unit 290 may be attached to the exemplary pad 110.

Figure 5:
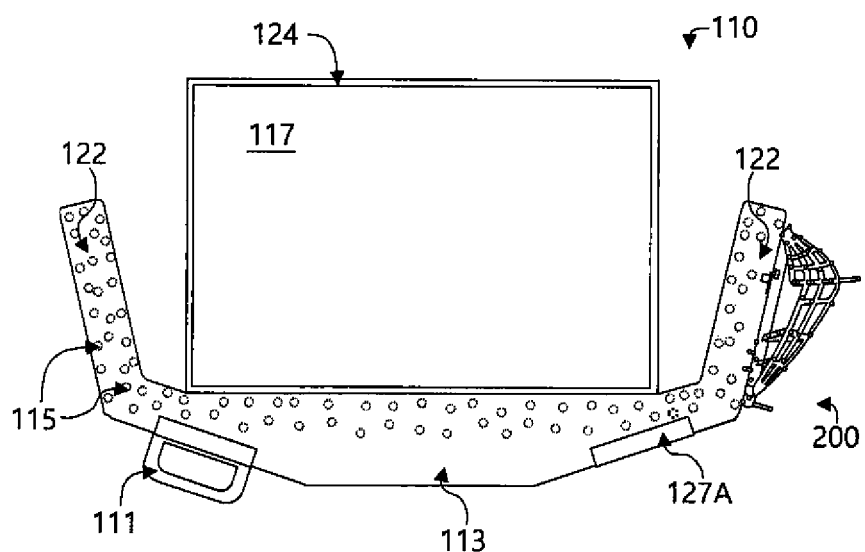
FIG. 5 illustrates an implementation of a stylus pen and a pad of the exemplary VR user interface devices.

FIG. 5 illustrates an implementation of a stylus pen 200 and a pad 110 of the exemplary VR user interface devices. The stylus pen 200 may be detachably mounted to the pad tracking part 113.

In some embodiments, the stylus pen 200 may be detachably mounted to at least a portion of the pad grip 111, the transparent touch part 117, the touch part frame 124, the support frames 126A, 126B, the accessories 190A, 190B, and the mounting accessories 701, 703.

In some embodiments, the stylus pen 200 may be detachably mounted to at least a portion of the pad tracking part 113, the pad grip 111, the transparent touch part 117, the touch part frame 124, the support frames 126A, 126B, the accessories 190A, 190B, and the mounting accessories 701, 703, using additional mounting accessories.

FIG. 6A is a block diagram showing an exemplary illustrative configuration of a VR HMD 140 of the exemplary virtual reality systems 90A and 90B. The VR HMD 140 may comprise one or more HMD displays 145A, one or more HMD microphones 145B, one or more HMD speakers 145C, one or more HMD sensors 141, one or more HMD communication interfaces 142, one or more HMD controllers 143, and one or more HMD power sources 144.

In some embodiments, the VR HMD 140 may further comprise one or more HMD input devices 147 for activating application programs or the various functions of the application programs.

In some embodiments, the VR HMD 140 may further comprise one or more HMD tracking parts 146. A plurality of light sources or a plurality of passive reflective markers or a plurality of photo detective sensors may be detachably disposed on or embedded under outside surfaces of the HMD tracking parts 146.

In some embodiments, the plurality of light sources or the plurality of passive reflective markers or the plurality of photo detective sensors may be detachably disposed on or embedded under an outside surface of the VR HMD 140.

In some embodiments, the HMD sensors 141 may comprise one or more gyroscopes, one or more accelerometers, and/or one or more magnetometers.

In some embodiments, a mobile phone may be detachably mounted to the VR HMD 140.

In some embodiments, the mobile phone may comprise one or more graphics processing unit (GPU) systems or one or more mobile application processors (AP) or one or more communication interfaces or one or more power sources or one or more external cameras or one or more displays or one or more microphones or one or more speakers or one or more IMU sensors or a plurality of light sources or a plurality of passive reflective markers or a plurality of photo detective sensors or one or more light emitters to provide light to the exemplary plurality of passive reflective markers (disposed on the outside surfaces of the exemplary pad 110 or the exemplary stylus pen 200) or one or more structured light emitters to emit structured light.

In some embodiments, the VR HMD 140 may further comprise one or more cameras detachably mounted on the front surface of the VR HMD 140 or integrated into the VR HMD 140.

In some embodiments, the exemplary cameras detachably mounted on the front surface of the VR HMD 140 or integrated into the VR HMD 140 may further comprise one or more IMU sensors or a plurality of light sources or a plurality of passive reflective markers or a plurality of photo detective sensors or one or more light emitters to provide light to the exemplary plurality of passive reflective markers (disposed on the outside surfaces of the exemplary pad 110 or the exemplary stylus pen 200) or one or more structured light emitters to emit structured light.

In some embodiments, the VR HMD 140 may further comprise one or more cameras fixed near the VR HMD 140 using one or more mounting accessories, and the cameras may be connected electrically to the VR HMD 140 or the mobile phone mounted to the VR HMD 140.

In some embodiments, the exemplary cameras fixed near the VR HMD 140 may further comprise one or more IMU sensors or a plurality of light sources or a plurality of passive reflective markers or a plurality of photo detective sensors or one or more light emitters to provide light to the exemplary plurality of passive reflective markers (disposed on the outside surfaces of the exemplary pad 110 or the exemplary stylus pen 200) or one or more structured light emitters to emit structured light.

In some embodiments, the VR HMD 140 may further comprise one or more light emitters to provide light to the exemplary plurality of passive reflective markers disposed on the outside surfaces of the exemplary pad 110 or the exemplary stylus pen 200 or one or more structured light emitters to emit structured light.

In some embodiments, the VR HMD 140 may communicate with the exemplary pad 110 or the exemplary stylus pen 200 or the exemplary external cameras 150 or 150A and 150B or the exemplary mobile phone mounted to the VR HMD 140 or the exemplary stylus control unit 290 or the exemplary cameras (mounted on the front surface of the VR HMD 140 or integrated into the VR HMD 140) or the exemplary cameras fixed near the VR HMD 140 or other VR computer systems via the HMD communication interfaces 142.

In some embodiments, the HMD power sources 144 may supply power to the HMD sensors 141, the HMD communication interfaces 142, the HMD controllers 142, the HMD displays 145A, the HMD microphones 145B, and the HMD speakers 145C.

In some embodiments, the HMD power sources 144 may supply power to the HMD input devices 147 or the plurality of light sources or the plurality of photo detective sensors disposed on the outside surfaces of the HMD tracking parts 146 or the light emitters or the mobile phone detachably mounted to the VR HMD 140 or the exemplary cameras (mounted on the front surface of the VR HMD 140 or integrated into the VR HMD 140) or the exemplary cameras fixed near the VR HMD 140 or the structured light emitters mounted to the VR HMD 140.

In some embodiments, the HMD controllers 143 may control the HMD sensors 141, the HMD communication interfaces 142, the HMD power sources 142, the HMD displays 145A, the HMD microphones 145B, the HMD speakers 145C.

In some embodiments, the HMD controllers 143 may control the HMD input devices 147 or the plurality of light sources or the plurality of photo detective sensors disposed on the outside surfaces of the HMD tracking parts 146 or the light emitters or the mobile phone detachably mounted to the VR HMD 140 or the exemplary cameras (mounted on the front surface of the VR HMD 140 or integrated into the VR HMD 140) or the exemplary cameras fixed near the VR HMD 140 or the structured light emitters mounted to the VR HMD 140.

In some embodiments, the HMD controllers 143 may comprise VR computer systems including GPU systems or CPU systems for processing the captured images transferred from the image sensors 151S or the data transferred from the camera sensors 151 other than the image sensors 151S or the data generated from the VR HMD 140 or the data transferred from the exemplary pad 110 or the data transferred from the exemplary stylus pen 200. The GPU systems or the CPU systems may process the data generated by the mobile phone mounted to the VR HMD 140 or the data generated by the exemplary cameras (mounted on the front surface of the VR HMD 140 or integrated into the VR HMD 140) or the data generated by the exemplary cameras fixed near the VR HMD 140 or the data transferred from the cameras 150P, 150Q.

FIG. 6B is a block diagram showing an exemplary illustrative configuration of external cameras 150 or 150A and 150B of the exemplary virtual reality systems 90A and 90B. Each of the external cameras 150A and 150B may comprise one or more camera communication interfaces 154, one or more camera controllers 152, one or more camera power sources 153, and one or more camera sensors 151 including one or more image sensors 151S.

In some embodiments, the camera sensors 151 of each of the external cameras 150A and 150B may further comprise one or more gyroscopes, one or more accelerometers, and/or one or more magnetometers.

In some embodiments, each of the external cameras 150A and 150B may communicate with the other external cameras 150A and 150B or the exemplary pad 110 or the exemplary stylus pen 200 or the VR HMD 140 or the exemplary mobile phone mounted to the VR HMD 140 or the stylus control unit 290 or other VR computer systems via the camera communication interfaces 154.

In some embodiments, the external cameras 150A and 150B may be connected to one or more camera synchronizers 156 for synchronizing the external cameras 150A and 150B.

In some embodiments, each of the external cameras 150A and 150B may further comprise one or more light emitters 155 to provide light to the exemplary plurality of passive reflective markers disposed on the outside surfaces of the exemplary pad 110 or the exemplary stylus pen 200 or the VR HMD 140.

In some embodiments, each of the external cameras 150A and 150B may comprise one or more structured light emitters configured to emit structured light, and the exemplary plurality of photo detective sensors disposed on the outside surfaces of the VR HMD 140 or the exemplary pad 110 or the exemplary stylus pen 200 may detect and track the structured light emitted by the emitters.

In some embodiments, the camera power sources 153 of each of the external cameras 150A and 150B may supply power to the camera sensors 151, the camera communication interfaces 154, and the camera controllers 152.

In some embodiments, the camera power sources 153 of each of the external cameras 150A and 150B may supply power to the light emitters 155 or the structured light emitters or the camera synchronizers 156 or the other external cameras 150A or 150B.

In some embodiments, the camera controllers 152 of each of the external cameras 150A and 150B may control the camera sensors 151, the camera communication interfaces 154, the camera power sources 153.

In some embodiments, the camera controllers 152 of each of the external cameras 150A and 150B may control the light emitters 155 or the structured light emitters or the camera synchronizers 156 or the other external cameras 150A or 150B.

In some embodiments, the camera controllers 152 of each of the external cameras 150A and 150B may further comprise VR computer systems including GPU systems or CPU systems for processing the captured images generated by the image sensors 151S or the data generated by the camera sensors 151 other than the image sensors 151S or the data transferred from the VR HMD 140 or the data transferred from the exemplary pad 110 or the data transferred from the exemplary stylus pen 200. The GPU systems or the CPU systems may process the data transferred from the mobile phone detachably mounted to the VR HMD 140 or the data transferred from the exemplary cameras (mounted on the front surface of the VR HMD 140 or integrated into the VR HMD 140) or the data transferred from the exemplary cameras fixed near the VR HMD 140 or the data transferred from the cameras 150P, 150Q.

FIG. 6C is a block diagram showing an exemplary illustrative configuration of a pad 110 of the exemplary VR user interface devices. The pad 110 may comprise one or more pad tracking parts 113, one or more pad communication interfaces 123, one or more pad power sources 118, and one or more pad controllers 121.

In some embodiments, the pad 119 may further comprise a pad touch sensor system 116 for sensing a touch of the stylus pen 200 and determining the location of the touch in the transparent touch part 117 area or the transparent touch sensor layer area.

In some embodiments, the pad touch sensor system 116 may comprise an optical system (e.g. infrared rays detecting system) or a surface acoustic wave system or one or more transparent touch sensor layers coupled to the surface of the transparent touch part 117.

In some embodiments, the pad 110 may further comprise one or more pad input devices 114 for activating application programs or the various functions of the application programs.

In some embodiments, the pad 110 may further comprise one or more pad sensors 112 including one or more gyroscopes, one or more accelerometers, and/or one or more magnetometers.

In some embodiments, the pad 110 may communicate with the exemplary VR HMD 140 or the exemplary stylus pen 200 or the exemplary external cameras 150A and 150B or the exemplary mobile phone mounted to the VR HMD 140 or the stylus control unit 290 or other VR computer systems via the pad communication interface 123.

In some embodiments, the pad 110 may further comprise the exemplary cameras 150P or the exemplary cameras 150Q.

In some embodiments, the cameras 150P, 150Q may further comprise one or more IMU sensors or a plurality of light sources or a plurality of passive reflective markers or a plurality of photo detective sensors or one or more light emitters to provide light to the exemplary plurality of passive reflective markers (disposed on the outside surfaces of the exemplary pad 110 or the exemplary stylus pen 200) or one or more structured light emitters to emit structured light.

In some embodiments, the cameras 150P, 150Q each may further comprise one or more controllers or one or more power sources.

In some embodiments, the cameras 150P, 150Q and the pad 110 may share their controllers or their power sources.

In some embodiments, each of the cameras 150P, 150Q and the pad 110 may be controlled by the other controllers without its own controllers or be powered by the other power sources without its own power sources.

In some embodiments, the pad power sources 118 may supply power to the pad communication interfaces 123 or the pad controllers 121 or the plurality of light sources 115 (light emitting diodes or infrared light emitting diodes or photo detective sensors) disposed on the outside surface of the pad tracking part 113.

In some embodiments, the pad power sources 118 may supply power to the pad touch sensor system 116 or the pad sensors 112 or the pad input devices 114.

In some embodiments, the pad controllers 121 may control the pad communication interfaces 123 or the pad power sources 118 or the plurality of light sources 115 (light emitting diodes or infrared light emitting diodes or photo detective sensors) disposed on the outside surface of the pad tracking part 113.

In some embodiments, the pad controllers 121 may control the pad touch sensor system 116 or the pad sensors 112 or the pad input devices 114.

In some embodiments, the pad controllers 121 may further comprise VR computer systems including GPU systems or CPU systems for processing the captured images transferred from the image sensors 151S or the data transferred from the camera sensors 151 other than the image sensors 151S or the data transferred from the VR HMD 140 or the data generated by the exemplary pad 110 or the data transferred from the exemplary stylus pen 200. The GPU systems or the CPU systems may process the data transferred from the mobile phone detachably mounted to the VR HMD 140 or the data transferred from the exemplary cameras (mounted on the front surface of the VR HMD 140 or integrated into the VR HMD 140) or the data transferred from the exemplary cameras fixed near the VR HMD 140 or the data generated by the cameras 150P, 150Q.

FIG. 6D is a block diagram showing an exemplary illustrative configuration of a stylus pen 200 of the exemplary VR user interface devices. The stylus pen 200 may comprise one or more stylus tracking parts 202, one or more stylus communication interfaces 292, one or more stylus power sources 270, and one or more stylus controllers 280.

In some embodiments, the stylus pen 200 may further comprise a stylus touch system 250 for sensing a touch of stylus tip 230 with the exemplary transparent touch part 117 or with the exemplary transparent touch sensor layer or for determining the location of the touch in the transparent touch part 117 area or the transparent touch sensor layer area.

In some embodiments, the stylus pen 200 may further comprise one or more stylus input devices 220 for activating application programs or the various functions of the application programs.

In some embodiments, the stylus pen 200 may further comprise one or more stylus sensors 235 including one or more gyroscopes, one or more accelerometers, and/or one or more magnetometers.

In some embodiments, the stylus pen 200 may communicate with the exemplary VR HMD 140 or the exemplary pad 110 or the exemplary external cameras 150A and 150B or the stylus control unit 290 or other VR computer systems via the stylus communication interface 292.

In some embodiments, the stylus power sources 270 may supply power to the stylus communication interlaces 292, the stylus controllers 280, and the plurality of light sources 205 (light emitting diodes or infrared light emitting diodes or photo detective sensors) disposed on the outside surface of the stylus tracking part 202.

In some embodiments, the stylus power sources 270 may supply power to the stylus touch system 250 or the stylus sensors 235 or the stylus input devices 220 or the controllers embedded in the stylus control unit 290.

In some embodiments, the stylus controllers 280 may control the stylus communication interfaces 292, the stylus power sources 270, and the plurality of light sources 205 (light emitting diodes or infrared light emitting diodes or photo detective sensors) disposed on the outside surface of the stylus tracking part 202.

In some embodiments, the stylus controllers 280 may control the stylus touch system 250 or the stylus sensors 235 or the stylus input devices 220 or the power sources embedded in the stylus control unit 290.

In some embodiments, the exemplary stylus control unit 290 may further comprise VR computer systems including GPU systems or CPU systems for processing the captured images transferred from the image sensors 151S or the data generated by the camera sensors 151 other than the image sensors 151S or the data transferred from the VR HMD 140 or the data transferred from the exemplary pad 110 or the data transferred from the exemplary stylus pen 200. The GPU systems or the CPU systems may process the data generated by the mobile phone detachably mounted to the VR HMD 140 or the data generated by the exemplary cameras (mounted on the front surface of the VR HMD 140 or integrated into the VR HMD 140) or the data generated by the exemplary cameras fixed near the VR HMD 140 or the data generated by the cameras 150P, 150Q.

Figure 7A:
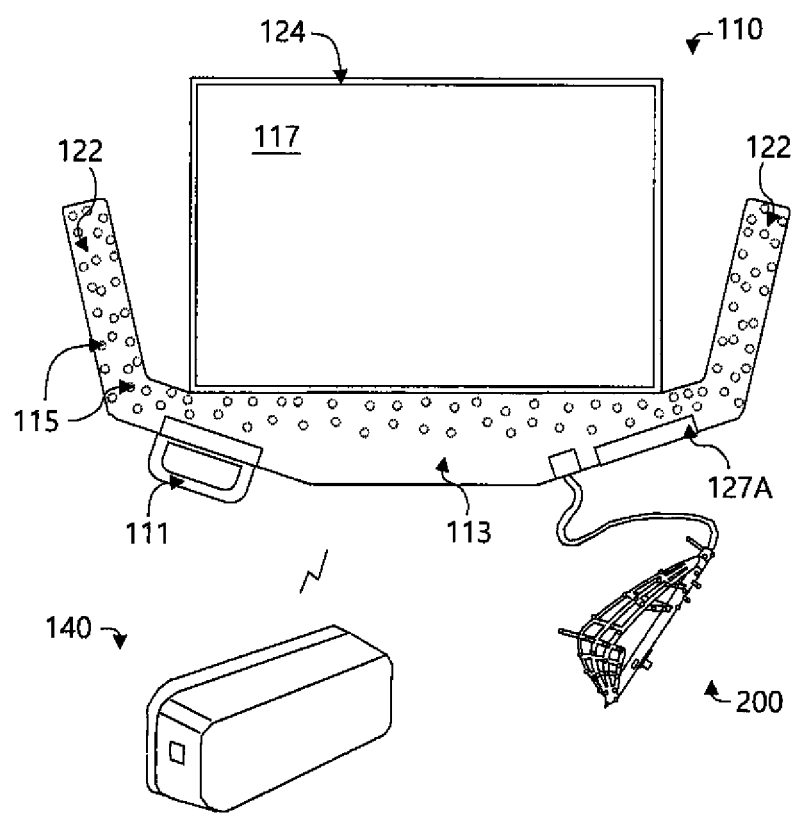
FIG. 7A illustrates an exemplary implementation of the communication and the electrical connection between a pad, a stylus pen, and a VR HMD of the exemplary virtual reality systems.

FIG. 7A illustrates an exemplary implementation of the communication and the electrical connection between a pad 110, a stylus pen 200, and a VR HMD 140 of the exemplary virtual reality systems 90A and 90B. The pad 110 is electrically wired to the stylus pen 200, and the VR HMD 140 can communicate with the pad 110 or the stylus pen 200 via the VR HMD communication interface 142 and the pad communication interfaces 123 or the stylus communication interfaces 292 wirelessly.

In some embodiments, the pad 110, the stylus pen 200 and the stylus control unit 290 may share their controllers or power sources, or be controlled by the controllers of the others, without its own controllers or be powered by the power sources of the others, without its own power sources.

In some embodiments, the exemplary mobile phone mounted to the VR HMD 140 and the VR HMD 140 may share their controllers or power sources or the VR HMD 140 be controlled by the mobile phone controllers, without its own controllers or be powered by the mobile phone power sources, without its own power sources.

In some embodiments, the VR HMD 140 may communicate with the pad 110 or the stylus pen 200 via the mobile phone communication interfaces without its own communication interfaces.

Figure 7B:
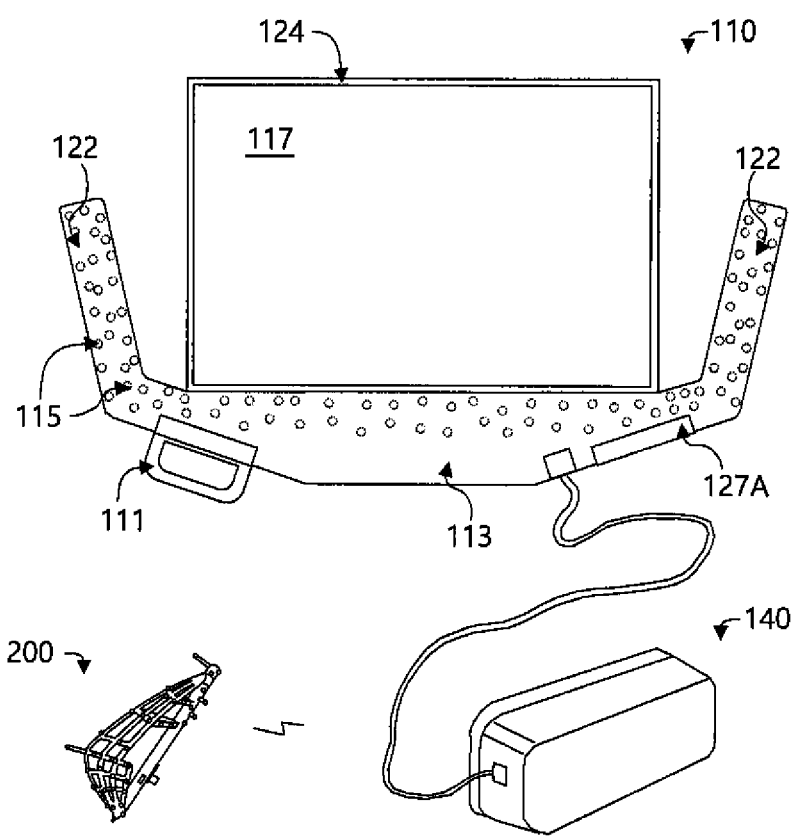
FIG. 7B illustrates another exemplary implementation of the communication and the electrical connection between a pad, a stylus pen, and a VR HMD of the exemplary virtual reality systems.

FIG. 7B illustrates another exemplary implementation of the communication and the electrical connection between a pad 110, a stylus pen 200, and a VR HMD 140 of the exemplary virtual reality systems 90A and 90B. The pad 110 is electrically wired to the VR HMD 140, and the stylus pen 200 can communicates with the pad 110 or the VR HMD 140 via the stylus communication interfaces 292 and the pad communication interfaces 123 or the HMD communication interfaces 142 wirelessly.

In some embodiments, the pad 110 and the VR HMD 140 may share their controllers or power sources, or be controlled by the opposite controllers, without its own controllers or be powered by the opposite power sources, without its own power sources.

In some embodiments, the exemplary mobile phone mounted to the VR HMD 140 and the pad 110 and the VR HMD 140 may share their controllers or power sources.

In some embodiments, the mobile phone mounted to the VR HMD 140 and the VR HMD 140 may share their controllers or power sources or the VR HMD 140 be controlled by the mobile phone controllers, without its own controllers or be powered by the mobile phone power sources, without its own power sources.

In some embodiments, the VR HMD 140 may communicate with the pad 110 or the stylus pen 200 via the mobile phone communication interfaces without its own communication interfaces.

Figure 7C:
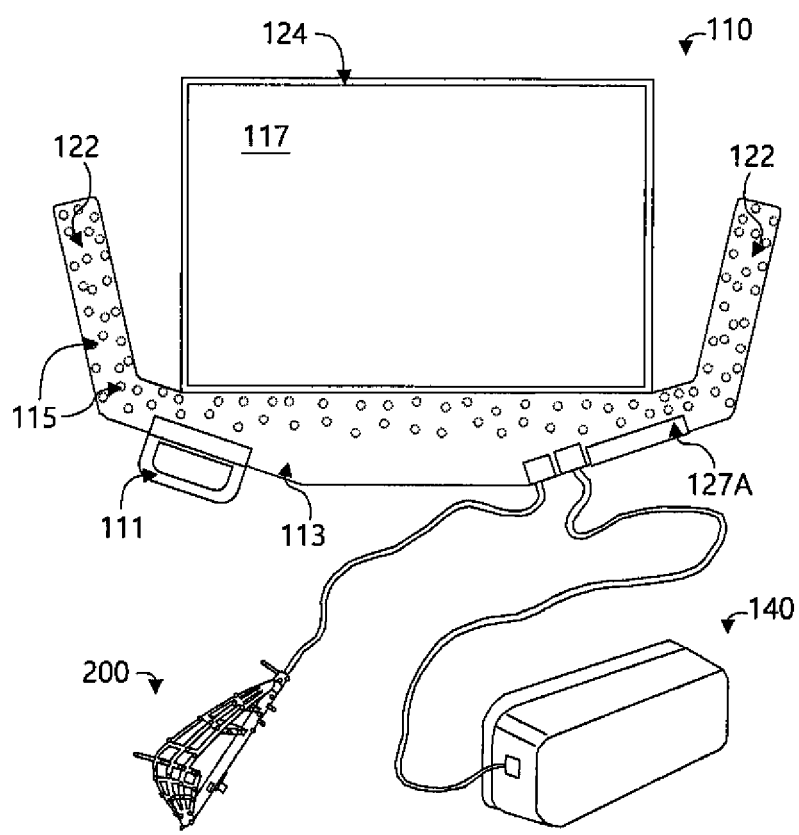
FIG. 7C illustrates another exemplary implementation of the communication and the electrical connection between a pad, a stylus pen, and a VR HMD of the exemplary virtual reality systems.

FIG. 7C illustrates another exemplary implementation of the communication and the electrical connection between a pad 110, a stylus pen 200, and a VR HMD 140 of the exemplary virtual reality systems 90A and 90B. The pad 110 is electrically wired to the VR HMD 140 and the stylus pen 200. The VR HMD 140 can communicate with the pad 110 by wire, and with the stylus pen 200 via the pad 110 by wire.

In some embodiments, the pad 110, the stylus pen 200, the VR HMD 140 and the stylus control unit 290 may share their controllers or power sources, or be controlled by the controllers of the others, without its own controllers or be powered by the power sources of the others, without its own power sources.

In some embodiments, the mobile phone mounted to the VR HMD 140 and the VR HMD 140 may share their controllers or power sources or the VR HMD 140 be controlled by the mobile phone controllers, without its own controllers or be powered by the mobile phone power sources, without its own power sources.

In some embodiments, the VR HMD 140 may communicate with the pad 110 or the stylus pen 200 via the mobile phone communication interfaces without its own communication interfaces.

Figure 7D:
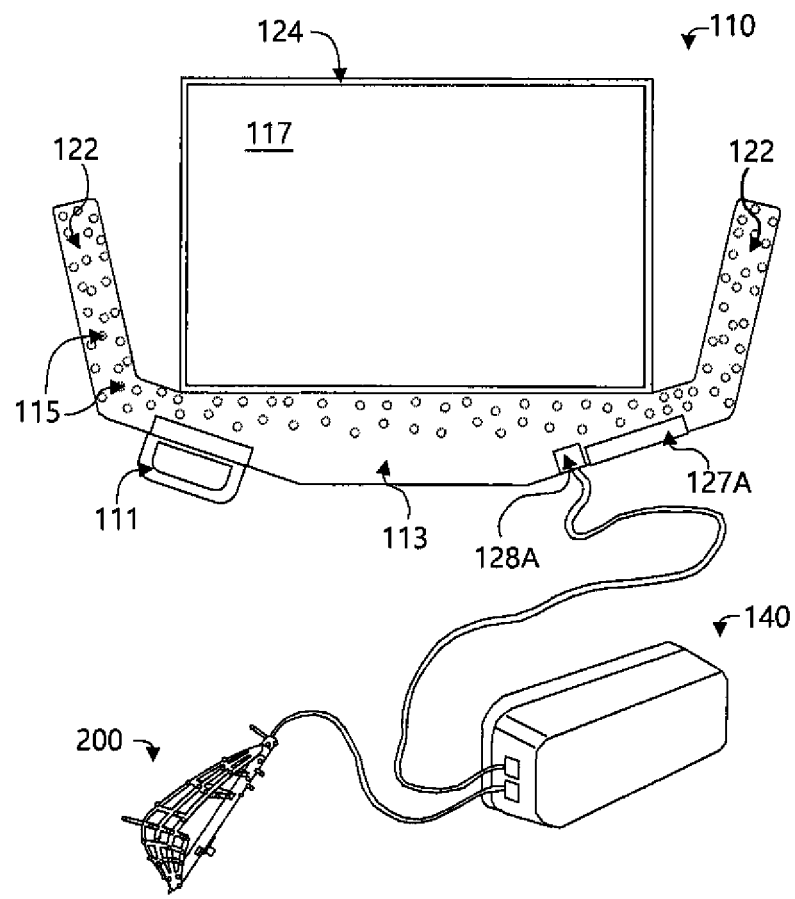
FIG. 7D illustrates another exemplary implementation of the communication and the electrical connection between a pad, a stylus pen, and a VR HMD of the exemplary virtual reality systems.

FIG. 7D illustrates another exemplary implementation of the communication and the electrical connection between a pad 110, a stylus pen 200, and a VR HMD 140 of the exemplary virtual reality systems 90A and 90B. The pad 110 is electrically wired to the VR HMD 140 and the VR HMD 140 is electrically wired to the stylus pen 200. The pad 110 can communicate with the VR HMD 140 by wire, and with the stylus pen 200 via the VR HMD 140 by wire.

In some embodiments, the pad 110, the stylus pen 200, the VR HMD 140 and the stylus control unit 290 may share their controllers or power sources, or be controlled by the controllers of the others, without its own controllers or be powered by the power sources of the others, without its own power sources.

In some embodiments, the exemplary mobile phone mounted to the VR HMD 140 and the pad 110 and the VR HMD 140 and the stylus pen 200 may share their controllers or power sources.

In some embodiments, the mobile phone mounted to the VR HMD 140 and the VR HMD 140 may share their controllers or power sources or the VR HMD 140 be controlled by the mobile phone controllers, without its own controllers or be powered by the mobile phone power sources, without its own power sources.

In some embodiments, the VR HMD 140 may communicate with the pad 110 or the stylus pen 200 via the mobile phone communication interfaces without its own communication interfaces.

Figure 7E:
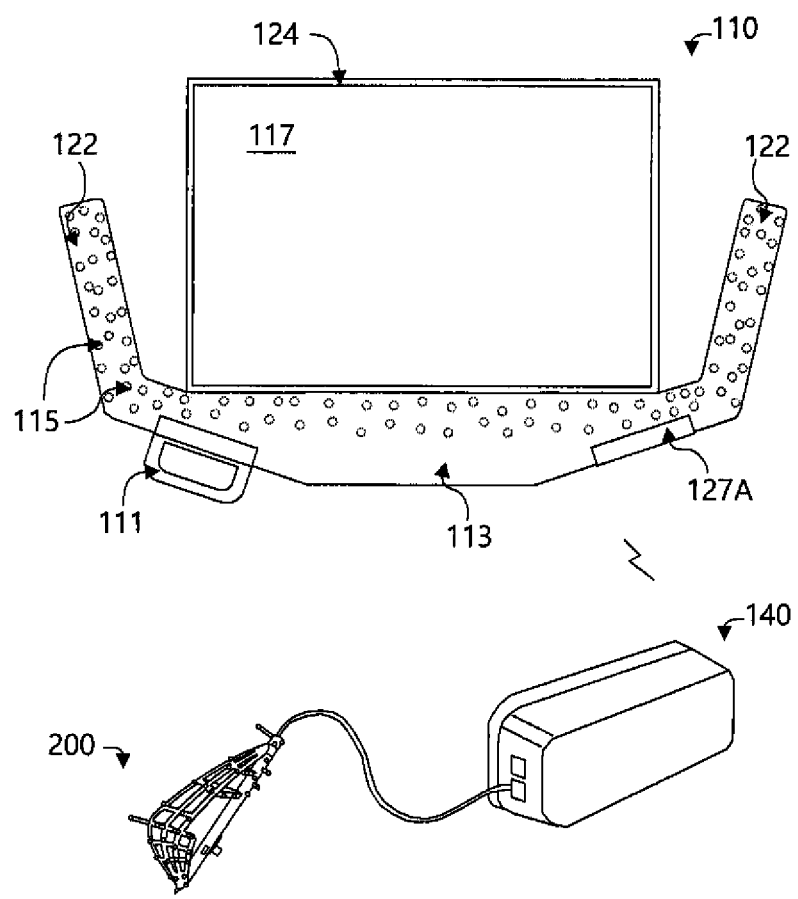
FIG. 7E illustrates another exemplary implementation of the communication and the electrical connection between a pad, a stylus pen, and a VR HMD of the exemplary virtual reality systems.

FIG. 7E illustrates another exemplary implementation of the communication and the electrical connection between a pad 110, a stylus pen 200, and a VR HMD 140 of the exemplary virtual reality systems 90A and 90B. The VR HMD 140 is electrically wired to the stylus pen 200, and the VR HMD 140 can communicate with the stylus pen 200 by wire, and the pad 110 can communicates with the VR HMD 140 or the stylus pen 200 via the pad communication interfaces 123 and the HMD communication interfaces 142 or the stylus communication interfaces 290 wirelessly.

In some embodiments, the VR HMD 140, the stylus pen 200 and the stylus control unit 290 may share their controllers or power sources, or be controlled by the controllers of the others, without its own controllers or be powered by the power sources of the others, without its own power sources.

In some embodiments, the mobile phone mounted to the VR HMD 140 and the VR HMD 140 may share their controllers or power sources or the VR HMD 140 be controlled by the mobile phone controllers, without its own controllers or be powered by the mobile phone power sources, without its own power sources.

In some embodiments, the VR HMD 140 may communicate with the pad 110 or the stylus pen 200 via the mobile phone communication interfaces without its own communication interfaces.

Figure 7F:
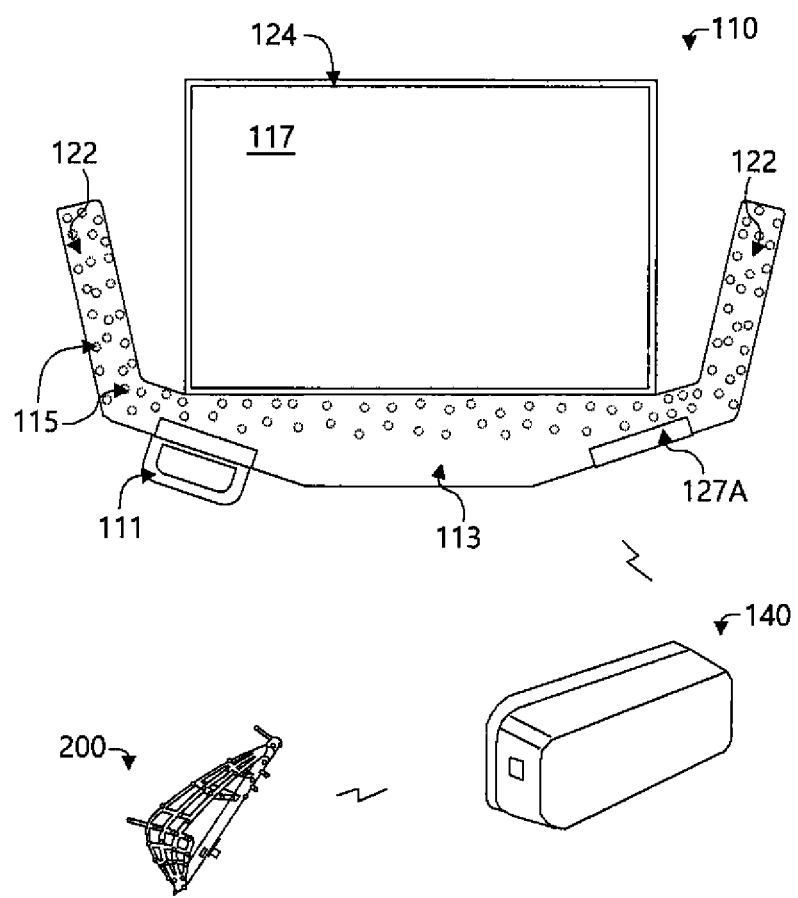
FIG. 7F illustrates another exemplary implementation of the communication and the electrical connection between a pad, a stylus pen, and a VR HMD of the exemplary virtual reality systems.

FIG. 7F illustrates another exemplary implementation of the communication and the electrical connection between a pad 110, a stylus pen 200, and a VR HMD 140 of the exemplary virtual reality systems 90A and 90B. The VR HMD 140 and the pad 110 and the stylus pen 200 can communicate wirelessly with the others via their own communication interfaces and the opposite communication interfaces.

In some embodiments, the exemplary mobile phone mounted to the VR HMD 140 and the VR HMD 140 may share their controllers or power sources or the VR HMD 140 be controlled by the mobile phone controllers, without its own controllers or be powered by the mobile phone power sources, without its own power sources.

In some embodiments, the VR HMD 140 may communicate with the pad 110 or the stylus pen 200 via the mobile phone communication interfaces without its own communication interfaces.

Figure 8A:
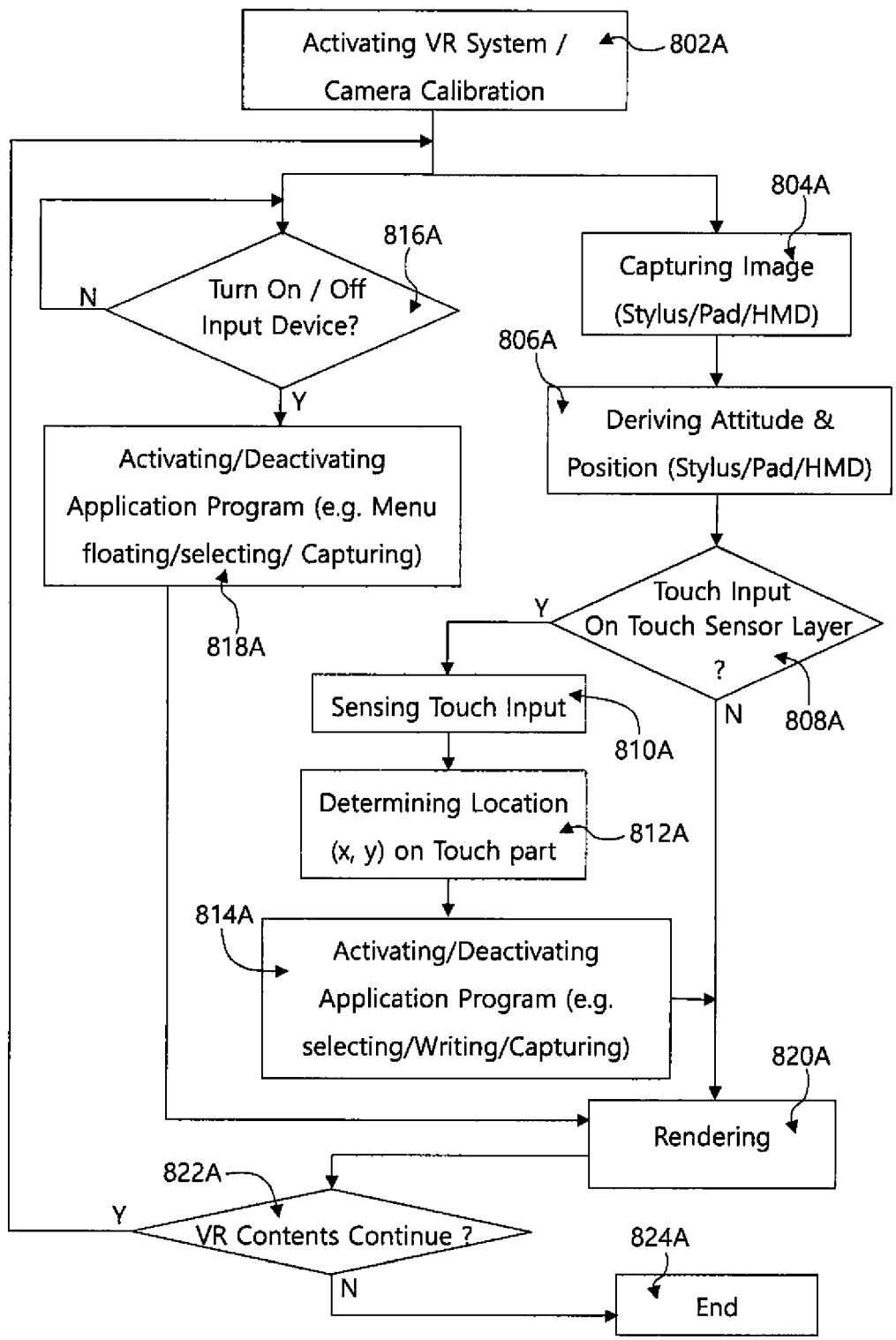
FIGS. 8A and 8B illustrate exemplary methods for implementing the exemplary VR user interface devices.
Figure 8B:
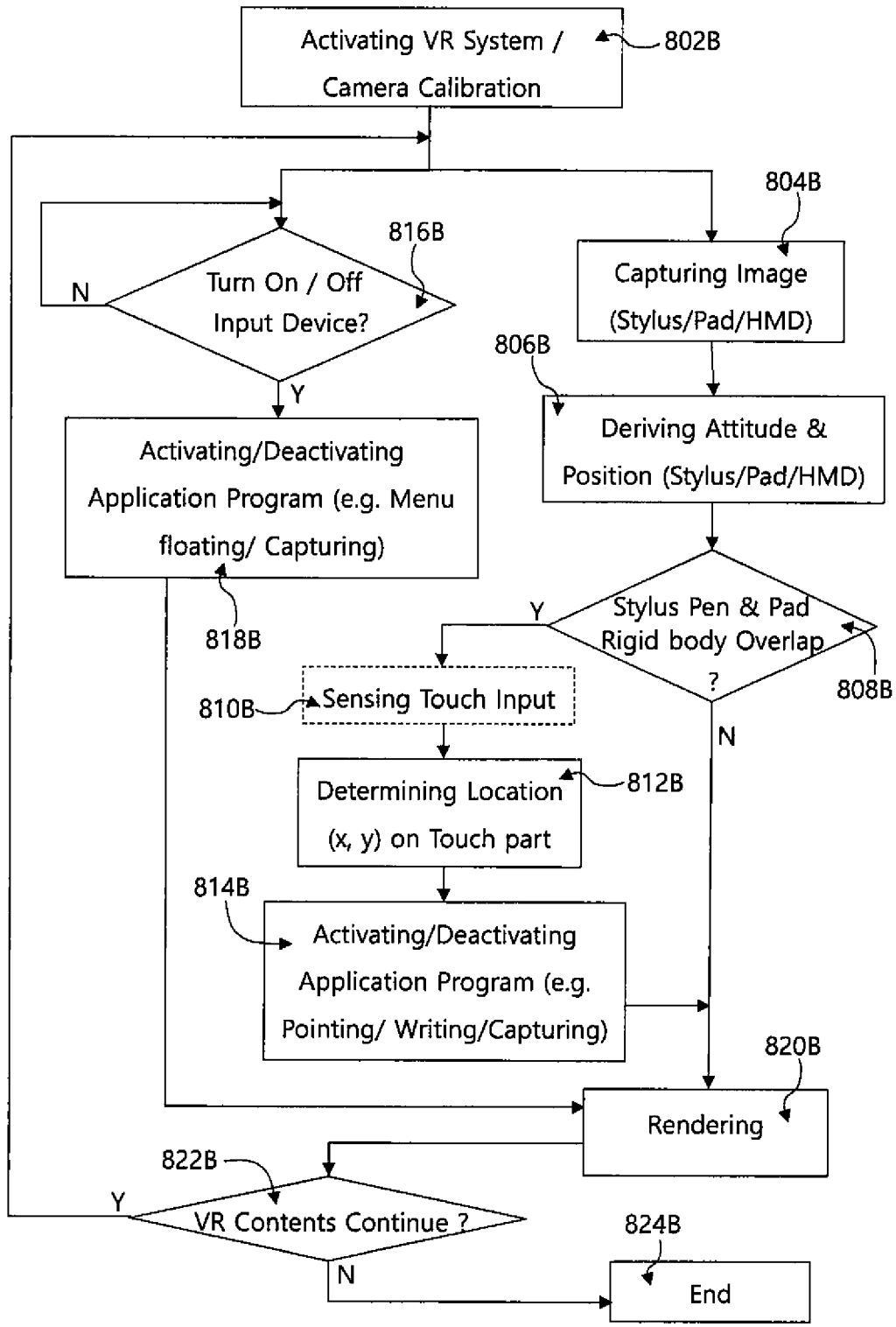

FIG. 8A and 8B illustrate exemplary methods for implementing the exemplary VR user interface devices. The method mainly comprises capturing 804A, 804B images of a VR HMD 140 and a plurality of light sources 115, 205 disposed on outside surfaces of a pad tracking part 113 of a pad 110 and a stylus tracking part 202 of a stylus pen 200 by one or more external cameras 150 or 150A and 150B; and deriving 806A, 806B the attitudes (yaw/pitch/roll) and the positions (x, y, z coordinates) of the VR HMD 140, the stylus pen 200, and the pad 110 from the captured images by the VR HMD 140 or other VR computer systems which may be built into the external cameras 150 or 150A and 150B or may be a mobile phone mounted to the VR HMD 140 or may be external computers; and rendering 820A, 820B the VR HMD 140, the stylus pen 200, and the pad 110, based on derived the attitudes and the positions in the VR HMD 140.

In some embodiments, VR contents may be displayed on the pad rendered in a virtual reality space in the VR HMD 140.

In some embodiments, the images of at least a portion of the plurality of light sources 205 disposed on the outside surface of the stylus tracking part 202 may be captured 804A, 804B through the transparent touch part 117 of the pad 110 by the external cameras 150 or 150A and 150B when the field of view of the external cameras 150 or 150A and 150B looking at the portion of the plurality of light sources 205 disposed on the outside surface of the stylus tracking part 202 is occluded by the pad 110.

In some embodiments, the images of at least a portion of the VR HMD 140 may be captured 804A, 804B through the transparent touch part 117 of the pad 110 by the external cameras 150 or 150A and 150E when the field of view of the external cameras 150 or 150A and 150B looking at the portion of the VR HMD 140 is occluded by the pad 110.

In some embodiments, if the volume data (x, y, z coordinates) of the stylus pen 200 rigid body overlap with the volume data (x, y, z coordinates) of the transparent touch part 117 rigid body in the 3D space, the method may further comprise determining 812B the location of the touch of the stylus pen 200 in the transparent touch part 117 area, based on data derived from the captured images.

In some embodiments, the determining 812B may be performed by deriving 806B 3D coordinates of edge or corners of the transparent touch part 117 and 3D coordinates where the volume data of the stylus pen 200 rigid body and the volume data of the transparent touch part 117 rigid body overlap each other, from the captured images, and by converting the 3D coordinates of the overlapped volume into 2D coordinates in the transparent touch part 117 area.

In some embodiments, the converting may be performed by interpolating the 3D coordinates of the overlapped volume and the 3D coordinates of the edge or the corners of the transparent touch part 117.

In some embodiments, the method may further comprise activating or deactivating 814B various functions and actions in application programs by the determined location of the touch of the stylus pen 200 in the transparent touch part 117 area, in the VR HMD 140 or other VR computer systems which may be built into the external cameras 150 or 150A and 150B or may be a mobile phone detachably mounted to the VR HMD 140 or may be external computers, before the rendering 820B.

In some embodiments, if the stylus pen 200 further comprise the exemplary stylus touch system 250, the method may further comprise sensing 8108 the touch of the stylus pen 200 over the transparent touch part 117, before the determining 812B.

In some embodiments, if the stylus pen 200 further comprise the exemplary stylus touch system 250 and the pad 110 further comprise the exemplary pad touch sensor system 116, the method may further comprise sensing 810A the touch of the stylus pen 200 over the transparent touch part 117 or the transparent touch sensor layer and sensing 810A the location of the touch in the transparent touch part 117 area or the transparent touch sensor layer area, before the determining 812A.

In some embodiments, the determining 812B may be performed by determining 812A the location of the touch of the stylus pen 200 in the transparent touch part 117 area or the transparent touch sensor layer area, based on data sensed 810A by the exemplary stylus touch system 250 and the exemplary pad touch sensor system 116.

In some embodiments, the activating or deactivating 814B may be performed by activating or deactivating 814A various functions and actions in application programs by the determined location of the touch of the stylus pen 200 in the transparent touch part 117 area or the transparent touch sensor layer area, in the VR HMD 140 or other VR computer systems which may be built into the external cameras 150 or 150A and 150B or a mobile phone detachably mounted to the VR HMD 140 or may be external computers, before the rendering 820A.

In some embodiments, the rendering 820A, 820B may be performed by rendering 820A, 820B the VR HMD 140, the stylus pen 200, and the pad 110 based on the derived attitudes and the derived positions of the VR HMD 140, the stylus pen 200, the pad 110, and by rendering 820A, 820B the various functions and the actions which are activated or deactivated 814A, 814B in application programs by the touch of the stylus pen 200, in the VR HMD 140.

In some embodiments, the method may further comprise turning on/off 816A, 816B one or more input devices 147, 114, 220 on the VR HMD 140 or the pad 110 or the stylus pen 200 for activating or deactivating the various functions of application programs; and activating or deactivating 818A, 818B the various functions of application programs in the VR HMD 140 or other VR computer systems which may be built into the external cameras 150 or 150A and 150B or a mobile phone detachably mounted to the VR HMD 140 or may be external computers, by the on/off signals.

In some embodiments, the turning on/off 816A, 816B, and the activating or the deactivating 818A, 818B may be performed in parallel with the capturing 804A, 804B, the deriving 806A, 806B, the sensing 810A, 810B, the determining 812A, 812B, and the activating or the deactivating 814A, 814B procedures.

In some embodiments, the method may further comprise camera calibration procedure 802A, 802B before the capturing 804A, 804B or the turning on/off 816A, 816B.

In some embodiments, after the rendering 820A, 820B is finished, if VR contents continue, the capturing 804A, 804B or the turning on/off 816A, 816B may start again.

In some embodiments, the capturing 804A, 804B images of the plurality of light sources 115 disposed on the outside surface of the pad tracking part 113 may be performed by adding one or more inertial measurement units.

In some embodiments, the capturing 804A, 804B images of the plurality of light sources 115 disposed on the outside surface of the pad tracking part 113 may be performed by deriving the attitude (yaw/pitch/roll) of the pad 110 by the one or more inertial measurement units when the field of view of the external cameras looking at the plurality of light sources 115 disposed on the outside surface of the pad tracking part 113 is occluded by other objects or a portion of the VR user's body.

In some embodiments, the capturing 804A, 804B images of the plurality of light sources 205 disposed on the outside surface of the stylus tracking part 202 may be performed by adding one or more inertial measurement units.

In some embodiments, the capturing 804A, 804B images of the plurality of light sources 205 disposed on the outside surface of the stylus tracking part 202 may be performed by deriving the attitude (yaw/pitch/roll) of the stylus pen 200 by the one or more inertial measurement units when the field of view of the external cameras looking at the plurality of light sources 205 disposed on the outside surface of the stylus tracking part 202 is occluded by other objects including the pad 110 or a portion of the VR user's body.

In some embodiments, the method may further comprise adjusting one or more balance weights 210 attached to the stylus pen 200 for improving the balance of the stylus pen 200. The adjusting may mean that the positions of the weights 210 on the stylus grip 201 are changed by a variable slot formed in the stylus grip 201 or the weights 210.

In some embodiments, the adjusting may be performed in parallel with all the procedures 802A-824A, 802B-824B.

In some embodiments, the plurality of light sources 115, 205 disposed on the outside surfaces of the pad tracking part 113 or the stylus tracking part 202 may comprise a plurality of passive reflective markers, and the external cameras 150 or 150A and 150B may comprise one or more light emitters 155 for supplying light to the passive reflective markers and one or more image sensors 151S for detecting and tracking the lights reflected by the passive reflective markers and coming back. In this case, the capturing 804A, 804B may be performed by capturing 804A, 804B images of the lights reflected from the passive reflective markers.

In some embodiments, the plurality of light sources 115, 205 disposed on the outside surfaces of the pad tracking part 113 or the stylus tracking part 202 may comprise a plurality of photo detective sensors, and one or more external structured light emitters may be placed in the surrounding space of a VR user to emit structured lights. The plurality of photo detective sensors may detect and track the structured light emitted by the structured light emitters. In this case, each of the plurality of photo detective sensors may capture 804A, 804B the structured lights from the structured light emitters, and derive 806A, 806B the attitudes and the positions of the stylus pen 200, the pad 110 from the captured data.

The technological elements of the present disclosure described above are not limited to these, but may be broadly applied as follows. Each of the exemplary resistive touch layers, the exemplary electrostatic capacitive touch layers, the exemplary electromagnetic resonance coupling wirings, the exemplary optical system, and the exemplary surface acoustic wave system included in the exemplary pad touch sensor system 116 may be independently applied or be applied in combination with the others to the pad touch sensor system 116. Each of the exemplary piezo-resistive sensors, the exemplary piezo-electric sensors, the exemplary strain gauges, the exemplary pressure sensitive system, the exemplary contact switch device, the exemplary stylus tip 230 made of conductive materials, the exemplary stylus grip 201 made of conductive materials, the exemplary disk coupled to the stylus tip 230, the exemplary circuits for generating the electromagnetic signal, and the exemplary induction coils included in the exemplary stylus touch system 250 may be independently applied or be applied in combination with the others to the stylus touch system 250.

The exemplary pad touch sensor system 116 or the exemplary stylus touch system 250 may support the functions to sense the distance of the stylus pen 200 hovering on the transparent touch part 117 or the transparent touch sensor layer, from the surface of the transparent touch part 117 or the transparent touch sensor layer, and to sense the location of the stylus pen 200 hovering in the transparent touch part 117 area or the transparent touch sensor layer area. If the hovering distance is less than or exceeds the set threshold value when the touch is not performed, the activating or deactivating 814A, 814B may be performed by the activating or deactivating 814A various functions and actions such as writing or drawing or selecting or image-capturing or menu floating in application programs by the location of the hovering of the stylus pen 200 in the transparent touch part 117 area or the transparent touch sensor layer area in the VR HMD 140 or other VR computer systems which may be built into the external cameras 150 or 150A and 150B or a mobile phone detachably mounted to the VR HMD 140 or may be external computers, before the rendering 820A.

The invention claimed is:

1. A virtual reality user interface device comprising:
an external camera;
a pad, the pad comprising:
a transparent touch part;
a pad tracking part;
a touch part frame coupled with an outer border area of the transparent touch part and coupled to a portion of the pad tracking part, wherein:
the pad tracking part comprises extension portions extending in a longitudinal direction of the transparent touch part at the periphery of both sides of the transparent touch part from the pad tracking part; and
a plurality of light sources disposed on an outside surface of the pad tracking part and set to emit light that can be detected by the external camera;
a stylus pen, the stylus pen comprising:
a stylus grip;
a stylus tip mounted to the stylus grip;
a stylus tracking part coupled to the stylus grip; and
a plurality of light sources disposed on an outside surface of the stylus tracking part and set to emit light that can be detected by the external camera, wherein:
if the field of view of the external camera looking at a portion of the plurality of light sources disposed on the outside surface of the stylus tracking part is occluded by the pad, the portion of the plurality of light sources disposed on the outside surface of the stylus tracking part are tracked through the transparent touch part of the pad by the external camera.

2. The virtual reality user interface device of claim 1, wherein:
at least a portion of the plurality of light sources disposed on the outside surface of the stylus tracking part are detected and tracked through the transparent touch part by one or more external cameras when the field of view of the one or more external cameras looking at the portion of the plurality of light sources disposed on the outside surface of the stylus tracking part is occluded by the pad.

3. The virtual reality user interface device of claim 1, wherein the pad further comprises one or more inertial measurement units.

4. The virtual reality user interface device of claim 1, wherein the stylus pen further comprises one or more inertial measurement units.

5. The virtual reality user interface device of claim 1, wherein the pad further comprises a pad grip that is detachably mounted to at least one of the pad tracking part, the transparent touch part, and the touch part frame.

6. The virtual reality user interface device of claim 1, wherein the transparent touch part further comprises a plurality of light sources disposed on an outside surface of the transparent touch part and set to emit light that can be detected by the external camera.

7. The virtual reality user interface device of claim 1, wherein the touch part frame further comprises a plurality of light sources disposed on an outside surface of the touch part frame and set to emit light that can be detected by the external camera.

8. The virtual reality user interface device of claim 1, wherein:
the extension portions are inclined at an angle with respect to the transparent touch part such that upper sections of the extension portions are closer to a VR user side than the transparent touch part when viewed from a side of the pad; and
a plurality of light sources is disposed on an outside surface of the extension portions and set to emit light that can be detected by the external camera.

9. The virtual reality user interface device of claim 1, wherein the extension portions are curved concave toward a VR user side such that upper sections of the extension portions are closer to the VR user side than the transparent touch part when viewed from a side of the pad; and
a plurality of light sources is disposed on an outside surface of the extension portions and set to emit light that can be detected by the external camera.

10. The virtual reality user interface device of claim 1, wherein the extension portions are connected to at least one of the touch part frame, the transparent touch part and the pad tracking part by one or more support frames; and
a plurality of light sources is disposed on an outside surface of the extension portions and set to emit light that can be detected by the external camera.

11. The virtual reality user interface device of claim 1, wherein:
the extension portions are inclined at an angle with respect to the transparent touch part such that outer sections of the extension portions are closer to a VR user side than inner sections of the extension portions when viewed from an upper side of the pad; and a plurality of light sources is disposed on an outside surface of the extension portions and set to emit light that can be detected by the external camera.

12. The virtual reality user interface device of claim 1, wherein surfaces opposite a VR user side of the extension portions are curved convexly when viewed from an upper side of the pad; and
a plurality of light sources is disposed on an outside surface of the extension portions and set to emit light that can be detected by the external camera.

13. The virtual reality user interface device of claim 1, wherein:
the stylus tracking part is coupled to a first section of the stylus grip; and
the first section of the stylus grip is a stylus grip area between the stylus grip boundary with a distance of 1 mm from the stylus tip and the stylus grip boundary with a distance of 70 mm from the stylus tip.

14. The virtual reality user interface device of claim 13, wherein:
the stylus tracking part is coupled to a second section of the stylus grip;
the stylus tracking part extends from the first section of the stylus grip to the second section of the stylus grip above an index finger and a thumb of a VR user holding the stylus grip; and
the second section of the stylus grip is a stylus grip area between the stylus grip boundary with a distance of 25 mm from the stylus tip and the end of the stylus grip opposite the stylus tip.

15. The virtual reality user interface device of claim 1, wherein:
the stylus tracking part is coupled to a second section of the stylus grip; and
the second section of the stylus grip is a stylus grip area between the stylus grip boundary with a distance of 25 mm from the stylus tip and the end of the stylus grip opposite the stylus tip.

16. The virtual reality user interface device of claim 1, wherein:
the stylus pen further comprises one or more support fixtures coupled to a stylus grip area between the stylus grip boundary with a distance of 2 mm from the stylus tip and the end of the stylus grip opposite the stylus tip, and the support fixtures are coupled to the stylus tracking part at the ends opposite the ends of the support fixtures that are coupled to the stylus grip.

17. The virtual reality user interface device of claim 1, wherein:
the stylus tracking part comprises a plurality of separated stylus tracking parts, and further comprises one or more support fixtures coupled to a stylus grip area between the stylus grip boundary with a distance of 2 mm from the stylus tip and the end of the stylus grip opposite the stylus tip; and
the support fixtures are coupled to the plurality of separated stylus tracking parts at the ends opposite the ends of the support fixtures that are coupled to the stylus grip.

18. The virtual reality user interface device of claim 1, wherein:
the stylus pen further comprises a support fixture containing finger grip sections on both sides of the support fixture;
the finger grip sections are concave;
the support fixture is coupled to a stylus grip area between the stylus grip boundary with a distance of 2 mm from the stylus tip and the end of the stylus grip opposite the stylus tip; and
the support fixture is coupled to the stylus tracking part at the end opposite the end of the support fixture that is coupled to the stylus grip.

19. The virtual reality user interface device of claim 1, wherein the stylus tracking part comprises a plurality of void areas in the inner area of the stylus tracking part.

20. The virtual reality user interface device of claim 1, wherein the stylus tracking part comprises one or more skeletal structures formed by connecting a plurality of frames together.

21. The virtual reality user interface device of claim 1, wherein the stylus tip is integrated into the stylus grip.

22. The virtual reality user interface device of claim 1, wherein the stylus pen further comprises one or more input devices on at least one of the stylus grip and the stylus tracking part; and
if the one or more input devices are turned on or turned off, specific functions of VR contents displayed on a rendered pad or specific functions of VR contents displayed in a virtual reality space are activated or deactivated and then the results are implemented on the rendered pad or in the virtual reality space.

23. The virtual reality user interface device of claim 1, wherein the stylus pen further comprises one or more balance weights mounted on the stylus grip; and
positions of the one or more balance weights on the stylus grip are changed by variable slots formed in the stylus grip or the weights.

24. The virtual reality user interface device of claim 1, wherein:
the device further comprises a stylus control unit;
the stylus control unit is separated from the stylus pen and wired electrically to the stylus pen; and
the stylus control unit comprises a power source to supply power to the stylus pen and a controller to control the stylus pen.

25. The virtual reality user interface device of claim 1, wherein:
the plurality of light sources disposed on the outside surface of the pad tracking part comprises a plurality of light emitting diodes, and
the plurality of light sources disposed on the outside surface of the stylus tracking part comprises a plurality of light emitting diodes.

26. The virtual reality user interface device of claim 1, wherein:
the plurality of light sources disposed on the outside surface of the pad tracking part comprises a plurality of passive reflective markers;
the plurality of light sources disposed on the outside surface of the stylus tracking part comprises a plurality of passive reflective markers; and
the external camera comprises one or more light emitters for supplying light to the plurality of passive reflective markers and one or more image sensors for detecting and tracking the lights reflected by the plurality of passive reflective markers and coming back.

* * * * *